United States Patent
Ono

(10) Patent No.: US 9,262,078 B2
(45) Date of Patent: Feb. 16, 2016

(54) INFORMATION PROCESSING DEVICE, METHOD FOR CONTROLLING INFORMATION PROCESSING DEVICE

(71) Applicant: FUJITSU LIMITED, Kawasaki-shi, Kanagawa (JP)

(72) Inventor: Takatsugu Ono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 267 days.

(21) Appl. No.: 13/950,435

(22) Filed: Jul. 25, 2013

(65) Prior Publication Data

US 2014/0095819 A1 Apr. 3, 2014

(30) Foreign Application Priority Data

Oct. 2, 2012 (JP) ................. 2012-220445

(51) Int. Cl.
*G06F 3/06* (2006.01)
*G06F 11/34* (2006.01)
*G06F 11/20* (2006.01)

(52) U.S. Cl.
CPC ............... *G06F 3/061* (2013.01); *G06F 3/065* (2013.01); *G06F 3/0632* (2013.01); *G06F 3/0653* (2013.01); *G06F 3/0683* (2013.01); *G06F 3/0688* (2013.01); *G06F 11/3433* (2013.01); *G06F 11/3485* (2013.01); *G06F 11/2069* (2013.01); *G06F 11/2082* (2013.01); *G06F 11/2094* (2013.01); *G06F 2201/81* (2013.01)

(58) Field of Classification Search
CPC . G06F 11/2094; G06F 3/067; G06F 11/2097; G06F 3/065; G06F 3/0689; G06F 11/1088; G06F 11/2082; G06F 11/2089; G06F 11/1092; G06F 11/2033; G06F 2212/261; G06F 3/061; G06F 3/0683; G06F 11/2069; G06F 11/3433; G06F 11/3485; G06F 2201/81; G06F 3/0632; G06F 3/0653; G06F 3/0688
See application file for complete search history.

(56) References Cited

U.S. PATENT DOCUMENTS

| | | | |
|---|---|---|---|
| 6,745,341 B1 * | 6/2004 | Onitsuka et al. | 714/6.3 |
| 8,225,006 B1 * | 7/2012 | Karamcheti | 710/5 |
| 2007/0168703 A1 * | 7/2007 | Elliott et al. | 714/6 |
| 2007/0271413 A1 | 11/2007 | Fujibayashi et al. | |
| 2008/0189466 A1 | 8/2008 | Hemmi | |

FOREIGN PATENT DOCUMENTS

| | | |
|---|---|---|
| JP | 2007-115232 | 5/2007 |
| JP | 2008-191966 | 8/2008 |

\* cited by examiner

*Primary Examiner* — Hashem Farrokh
(74) *Attorney, Agent, or Firm* — Staas & Halsey LLP

(57) ABSTRACT

An information processing device includes a plurality of arithmetic processing devices, a plurality of storage devices, a connection section that connects a first arithmetic processing device to a first storage device and a second storage device which are duplexed and a control section that causes, when the performance of the second storage device is reduced, the connection section to cut out the second storage device whose performance has been reduced from the first arithmetic processing device and the first storage device, causes to duplex a third storage device with the first storage device, causes the connection section to connect the first storage device and the third storage device which have been duplexed to the first arithmetic processing device and to connect a second arithmetic processing device to the second storage device that has been cut out, and causes the second arithmetic processing device to initialize the second storage device.

11 Claims, 22 Drawing Sheets

FIG. 6

| MTBL | SSD 0 | SSD 1 | SSD 2 | SSD 3 | SSD 4 | ..... | SSD 15 | SSD 16 | SSD 17 | SSD 18 | SSD 19 | SSD 20 | ..... | SSD 60 | SSD 61 | SSD 62 | SSD 63 |
|---|---|---|---|---|---|---|---|---|---|---|---|---|---|---|---|---|---|
| PC0 | 1 | 1 | 1 | 1 | | | | | | | | | | | | | |
| PC1 | | | | | | | | 2 | 2 | | | | | | | | |
| PC2 | | | | | | | | 2 | 2 | | | | | | | | |
| PC3 | | | | | | | | | | | | | | | | | |
| PC4 | | | | | | | | | | | | | | | | | |
| PC5 | | | | | | | | | | | | | | | | | |
| PC6 | | | | | | | | | | | | | | | | | |
| PC7 | | | | | | | | | | | | | | | | | |
| PC8 | | | | | | | | | | | | | | | | | |
| PC9 | | | | | | | | | | | | | | | | | |
| PC10 | | | | | | | | | | | | | | | | | |
| PC11 | | | | | | | | | | | | | | | | | |
| PC12 | | | | | | | | | | | | | | | | | |
| PC13 | | | | | | | | | | | | | | | | | |
| PC14 | | | | | | | | | | | | | | | | | |
| PC15 | | | | | | | | | | | | | | | | | |

FIG. 7

| CTBL0 | SSD 0 | SSD 1 | SSD 2 | SSD 3 | ... | SSD 15 |
|---|---|---|---|---|---|---|
| PC0 | 1 | 1 | 1 | 1 | | |
| PC1 | | | | | | |
| PC2 | | | | | | |
| PC3 | | | | | | |
| PC4 | | | | | | |
| PC5 | | | | | | |
| PC6 | | | | | | |
| PC7 | | | | | | |
| PC8 | | | | | | |
| PC9 | | | | | | |
| PC10 | | | | | | |
| PC11 | | | | | | |
| PC12 | | | | | | |
| PC13 | | | | | | |
| PC14 | | | | | | |
| PC15 | | | | | | |

EXP0

| CTBL1 | SSD 16 | SSD 17 | SSD 18 | ... | SSD 31 |
|---|---|---|---|---|---|
| PC0 | | | | | |
| PC1 | 2 | 2 | | | |
| PC2 | 2 | 2 | | | |
| PC3 | | | | | |
| PC4 | | | | | |
| PC5 | | | | | |
| PC6 | | | | | |
| PC7 | | | | | |
| PC8 | | | | | |
| PC9 | | | | | |
| PC10 | | | | | |
| PC11 | | | | | |
| PC12 | | | | | |
| PC13 | | | | | |
| PC14 | | | | | |
| PC15 | | | | | |

EXP1

| CTBL2 | SSD 32 | ... | SSD 47 |
|---|---|---|---|
| PC0 | | | |
| PC1 | | | |
| PC2 | | | |
| PC3 | | | |
| PC4 | | | |
| PC5 | | | |
| PC6 | | | |
| PC7 | | | |
| PC8 | | | |
| PC9 | | | |
| PC10 | | | |
| PC11 | | | |
| PC12 | | | |
| PC13 | | | |
| PC14 | | | |
| PC15 | | | |

EXP2

| CTBL3 | SSD 48 | ... | SSD 63 |
|---|---|---|---|
| PC0 | | | |
| PC1 | | | |
| PC2 | | | |
| PC3 | | | |
| PC4 | | | |
| PC5 | | | |
| PC6 | | | |
| PC7 | | | |
| PC8 | | | |
| PC9 | | | |
| PC10 | | | |
| PC11 | | | |
| PC12 | | | |
| PC13 | | | |
| PC14 | | | |
| PC15 | | | |

EXP3

FIG. 10

PERFORMANCE MONITORING TABLE FOR ZONE GROUP 1

| SSD | TOTAL CAPACITY | INITIAL USED CAPACITY | THRESHOLD | ACCUMULATED WRITE AMOUNT |
|---|---|---|---|---|
| SSD0 | 120 GB | 0 GB | 180 GB | 10 GB |
| SSD1 | 120 GB | 0 GB | 180 GB | 80 GB |
| SSD2 | 120 GB | 0 GB | 180 GB | 20 GB |
| SSD3 | 120 GB | 0 GB | 180 GB | 5 GB |

PERFORMANCE MONITORING TABLE FOR ZONE GROUP 2

| SSD | TOTAL CAPACITY | INITIAL USED CAPACITY | THRESHOLD | ACCUMULATED WRITE AMOUNT |
|---|---|---|---|---|
| SSD16 | 120 GB | 0 GB | 180 GB | 30 GB |
| SSD17 | 120 GB | 0 GB | 180 GB | 50 GB |

FIG. 13

| MTBL | SSD 0 | SSD 1 | SSD 2 | SSD 3 | SSD 4 | ..... | SSD 15 | SSD 16 | SSD 17 | SSD 18 | SSD 19 | SSD 20 | ..... | SSD 60 | SSD 61 | SSD 62 | SSD 63 |
|---|---|---|---|---|---|---|---|---|---|---|---|---|---|---|---|---|---|
| PRC0 | 1 | | | | | | | | | | | | | | | | |
| PRC1 | | | 1 | 1 | | | | | | | | | | | | | |
| PRC2 | | | | | | | | 2 | 2 | | | | | | | | |
| PRC3 | | | | | | | | 2 | 2 | | | | | | | | |
| PRC4 | | | | | | | | | | | | | | | | | |
| PRC5 | | | | | | | | | | | | | | | | | |
| PRC6 | | | | | | | | | | | | | | | | | |
| PRC7 | | | | | | | | | | | | | | | | | |
| PRC8 | | | | | | | | | | | | | | | | | |
| PRC9 | | | | | | | | | | | | | | | | | |
| PRC10 | | | | | | | | | | | | | | | | | |
| PRC11 | | | | | | | | | | | | | | | | | |
| PRC12 | | | | | | | | | | | | | | | | | |
| PRC13 | | | | | | | | | | | | | | | | | |
| PRC14 | | 3 | | | | | 3 | | | | | | | | | | |
| PRC15 | | | | | | | | | | | | | | | | | |

FIG. 19

| STBL | SSD 0 | SSD 1 | SSD 2 | ..... | SSD 15 | SSD 16 | SSD 17 | SSD 18 | ..... | SSD 31 | SSD 32 | SSD 33 | ..... | SSD 60 | SSD 61 | SSD 62 | SSD 63 |
|---|---|---|---|---|---|---|---|---|---|---|---|---|---|---|---|---|---|
| RD | 1 | 1 | 1 | ..... | 1 | | | | | | | | | | | | |
| WR | | | | | | 1 | 1 | 1 | ..... | 1 | | | | | | | |
| RW | | | | | | | | | | | 1 | 1 | ..... | 1 | 1 | 1 | 1 |

FIG. 21

PERFORMANCE MONITORING TABLE FOR ZONE GROUP 1

| SSD | TOTAL CAPACITY | INITIAL USED CAPACITY | THRESHOLD | ACCUMULATED WRITE AMOUNT | ACCUMULATED READ AMOUNT |
|---|---|---|---|---|---|
| SSD0 | 120 GB | 0 GB | 180 GB | 10 GB | 50 GB |
| SSD1 | 120 GB | 0 GB | 180 GB | 80 GB | 100 GB |
| SSD2 | 120 GB | 0 GB | 180 GB | 20 GB | 320 GB |
| SSD3 | 120 GB | 0 GB | 180 GB | 5 GB | 15 GB |

PERFORMANCE MONITORING TABLE FOR ZONE GROUP 2

| SSD | TOTAL CAPACITY | INITIAL USED CAPACITY | THRESHOLD | ACCUMULATED WRITE AMOUNT | ACCUMULATED READ AMOUNT |
|---|---|---|---|---|---|
| SSD16 | 120 GB | 0 GB | 180 GB | 30 GB | 5 GB |
| SSD17 | 120 GB | 0 GB | 180 GB | 50 GB | 10 GB |

FIG. 22

| STBL | SSD 0 | SSD 1 | ..... | SSD 7 | SSD 8 | ..... | SSD 15 | SSD 16 | ..... | SSD 23 | SSD 24 | ..... | SSD 31 | SSD 32 | SSD 33 | ..... | SSD 62 | SSD 63 |
|---|---|---|---|---|---|---|---|---|---|---|---|---|---|---|---|---|---|---|
| RDS | 1 | 1 | ..... | | | | | | | | | | | | | | | |
| RDR | | | | 1 | 1 | | 1 | | | | | | | | | | | |
| WRS | | | | | | | | 1 | ..... | 1 | | | | | | | | |
| WRR | | | | | | | | | | | 1 | ..... | 1 | | | | | |
| RW | | | | | | | | | | | | | | 1 | 1 | ..... | 1 | 1 |

INFORMATION PROCESSING DEVICE, METHOD FOR CONTROLLING INFORMATION PROCESSING DEVICE

CROSS-REFERENCE TO RELATED APPLICATION

This application is based upon and claims the benefit of priority of the prior Japanese Patent Application No. 2012-220445, filed on Oct. 2, 2012, the entire contents of which are incorporated herein by reference.

FIELD

The embodiments discussed herein are related to an information processing device and a method for controlling an information processing device.

BACKGROUND

In recent years, a storage system including a nonvolatile memory has been proposed. In this type of storage system, a separate controller other than a controller that controls read and write of data copies data stored in a nonvolatile memory chip in which a failure has occurred to another nonvolatile memory chip (for example, Japanese Laid-open Patent Publication No. 2008-191966). Also, in this type of storage system, while the life of a nonvolatile memory is managed, data stored in a hard disk drive is moved to the nonvolatile memory, thereby reducing power consumption of the entire storage system (for example, Japanese Laid-open Patent Publication No. 2007-115232).

It has been known that, in a storage system, as the data write amount increases, the access efficiency reduces. For example, in a storage system including a hard disk drive, as a result of repeating of write and deletion of a file, fragmentation of a file occurs, and the access speed is reduced. On the other hand, in a nonvolatile memory, such as a flash memory and so forth, data is erased in a unit of block before data is rewritten. Thus, in a storage system including a nonvolatile memory, such as a flash memory and so forth, as the write data amount increases, the throughput of a write operation reduces.

However, there has not been any proposed method yet in which, while increase in load of a system is reduced, the performance of a storage system, which has been degraded by reduction in access efficiency and so forth, is recovered.

SUMMARY

According to an aspect of the invention, an information processing device includes a plurality of arithmetic processing devices, a plurality of storage devices, a connection section that connects a first arithmetic processing device to a first storage device and a second storage device which are duplexed and a control section that causes, when the performance of the second storage device is reduced, the connection section to cut out the second storage device whose performance has been reduced from the first arithmetic processing device and the first storage device, causes to duplex a third storage device with the first storage device, causes the connection section to connect the first storage device and the third storage device which have been duplexed to the first arithmetic processing device and to connect a second arithmetic processing device to the second storage device that has been cut out, and causes the second arithmetic processing device to initialize the second storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of an entire management table illustrated in FIG. 4;

FIG. 7 is a diagram illustrating examples of connection management tables illustrated in FIG. 4;

FIG. 10 is a diagram illustrating examples of a performance monitoring table generated by Step S12 illustrated in FIG. 9;

FIG. 13 is an example of the entire management table when Step S72 of FIG. 11 is executed;

FIG. 19 is a diagram illustrating an example of a memory characteristic table illustrated in FIG. 18;

FIG. 21 is a diagram illustrating an example of a performance monitoring table generated by Step S12 illustrated in FIG. 20; and FIG. 22 is a diagram illustrating an example of a memory characteristic table according to another embodiment.

DESCRIPTION OF EMBODIMENTS

Hereinafter, embodiments will be described with reference to the accompanying drawings.

Figure 1:
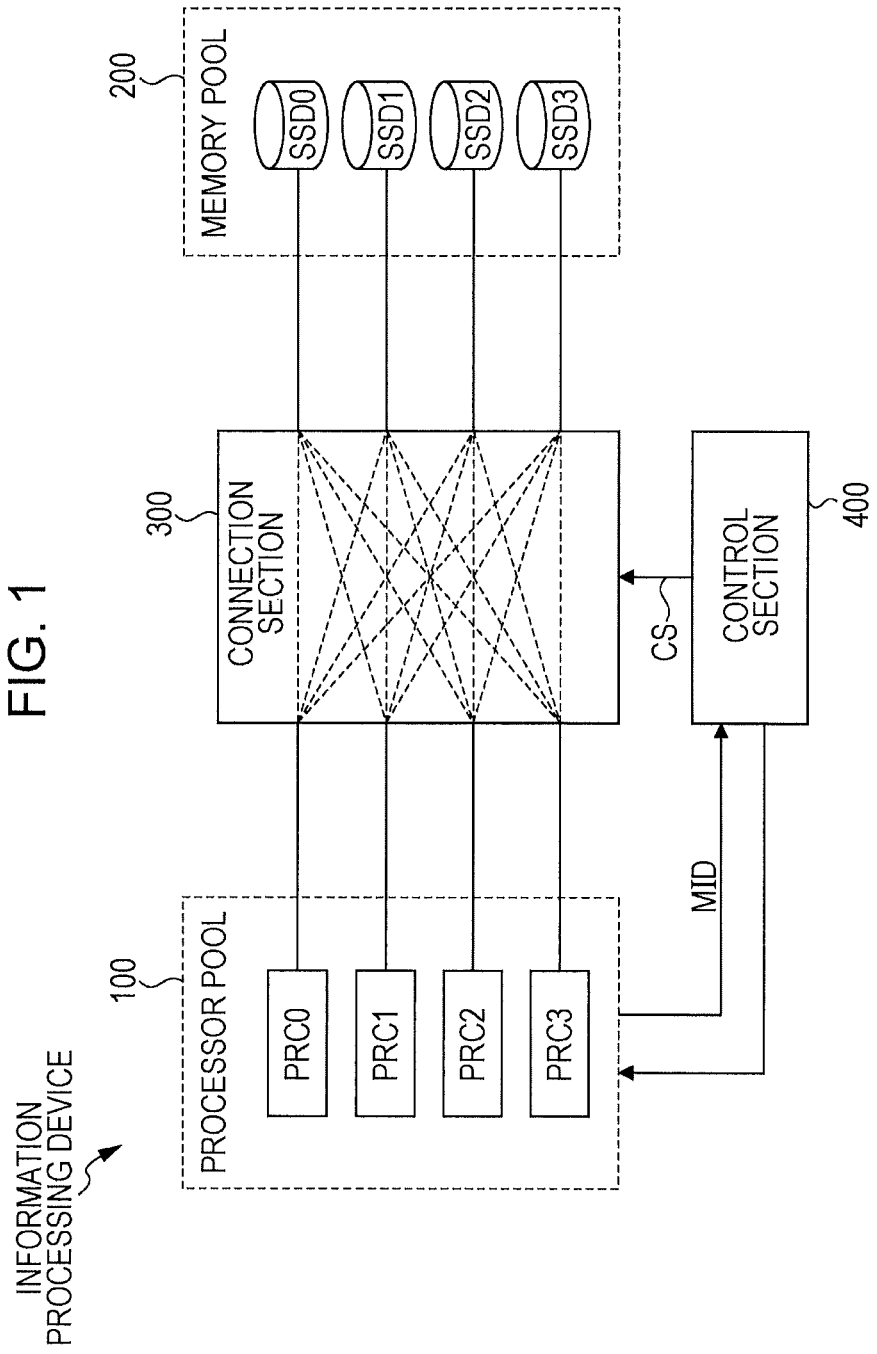
FIG. 1 is a diagram illustrating an example of an information processing device according to an embodiment.

FIG. 1 is a diagram illustrating an example of an information processing device according to an embodiment. The information processing device includes a processor pool 100, a memory pool 200, a connection section 300, and a control section 400. The processor pool 100 includes, as an arithmetic processing device, a plurality of processors PRC (PRC0, PRC1, PRC2, and PRC3), such as central processing units (CPUs) and so forth. The memory pool 200 includes a plurality of storage devices SSD (SSD0, SSD1, SSD2, and SSD3). For example, the storage devices SSD are flash storages, such as solid state drives (SSD) each including a plurality of flash memory chips, and so forth. Note that, in this embodiment, the processor pool 100 includes four processors PRC, but the number of the processors PRC may be two or more. The memory pool 200 includes four storage devices SSD, but the number of the storage devices SSD may be three or more.

The connection section 300 connects, on the basis of a connection specification CS that is information on how the processors PRC are connected to the storage devices SSD and is transmitted from the control section 400, a predetermined number of ones of the processors PRC to a predetermined number of ones of the storage devices SSD to construct a system, or cancel connections of the storage devices SSD with the processors PRC. When connections of all of the storage devices SSD with the processors PRC are released, the constructed system is canceled. The dashed lines drawn in the connection section 300 indicate that any one of the processors PRC may be connected to any one of the storage devices SSD on the basis of the connection specification CS.

The control section 400 includes a computer device including a processor, such as a CPU and so forth. The processor implements a function of controlling the operation of the connection section 300 and a function of giving an instruction to the processors PRC in the processor pool 100 by executing a control program. The control section 400 outputs information of the connection specification CS to the connection section 300.

For example, the processors PRC included in the system constructed on the basis of the connection specification CS each have a function as a detection section that monitors access statuses of the storage devices SSD and detects reduction in performance of the storage devices SSD to a lower level than a predetermined performance level. The function of the detection section is implemented by executing a detection program by the processor PRC. For example, the detection program is executed between executions of the user program by the processors PRC. The processor PRC that executes the detection program has a function of notifying the control section 400 of information MID indicating the storage device SSD whose performance has been reduced.

The control section 400 changes the connection specification CS on the basis of the information MID transmitted from the processor PRC. An example of changing the connection specification CS will be described with reference to FIG. 2 and FIG. 3. Note that the detection section may be implemented using a processor or a hardware other than the processors PRC provided in the processor pool 100.

For example, the processor PRC that executes the detection program monitors a throughput, such as a data transfer rate and so forth, for each of the storage devices SSD and, detects, when the throughput is reduced to a value lower than a predetermined value, reduction in performance of a corresponding one of the storage devices SSD. The storage device SSD whose performance has been reduced normally operates, although its throughput is reduced. Therefore, detection of reduction in performance of the storage device SSD is different from detection of a failure of the storage device SSD and detection of the life thereof. For example, for the storage device SSD whose performance has been reduced, the performance may be recovered by initialization.

In a flash storage, change from an erased state (for example, logic 1) to a write state (for example, logic 0) is executed in a unit of memory cell, and change from a write state to an erased state is executed in a unit of block. That is, rewrite of data to a memory cell in which data is written is executed with rewrite of data to another memory cell in the corresponding block after data of the corresponding block is erased. Therefore, in a flash storage in which data of a greater amount than a predetermined amount is written, an erase operation is easily caused to occur in response to a data write request, and a throughput of write data is reduced.

When the throughput of write data is accurately evaluated, the processor PRC or some other hardware monitors a data write amount per unit time for each memory region of the storage device SSD. Thus, the load of the processor PRC increases, and the performance as a user system reduces. In contrast, in this embodiment, by monitoring an accumulated data write amount for each storage device SSD, increase in load of the processor PRC may be reduced and reduction in performance of the storage device SSD may be effectively determined in a simple manner, as compared to the case where the throughput is directly evaluated.

In this embodiment, for example, the processor PRC that executes the detection program accumulates the amount of data written to each storage device SSD in the system. When the accumulated data write amount has exceeded a predetermined threshold, the processor PRC determines that the frequency of data write in which an erase operation occurs has increased, and detects reduction in performance of the corresponding storage section SSD. The storage device SSD for which reduction in performance has been detected is replaced with an unused one of the storage devices SSD provided in the memory pool 200 in accordance with change of the connection specification CS performed by the control section 400. Thus, the performance of the storage device SSD connected to the processor PRC is recovered, the frequency of data write in which an erase operation occurs is reduced, and the throughput of data write is increased.

Figure 2:
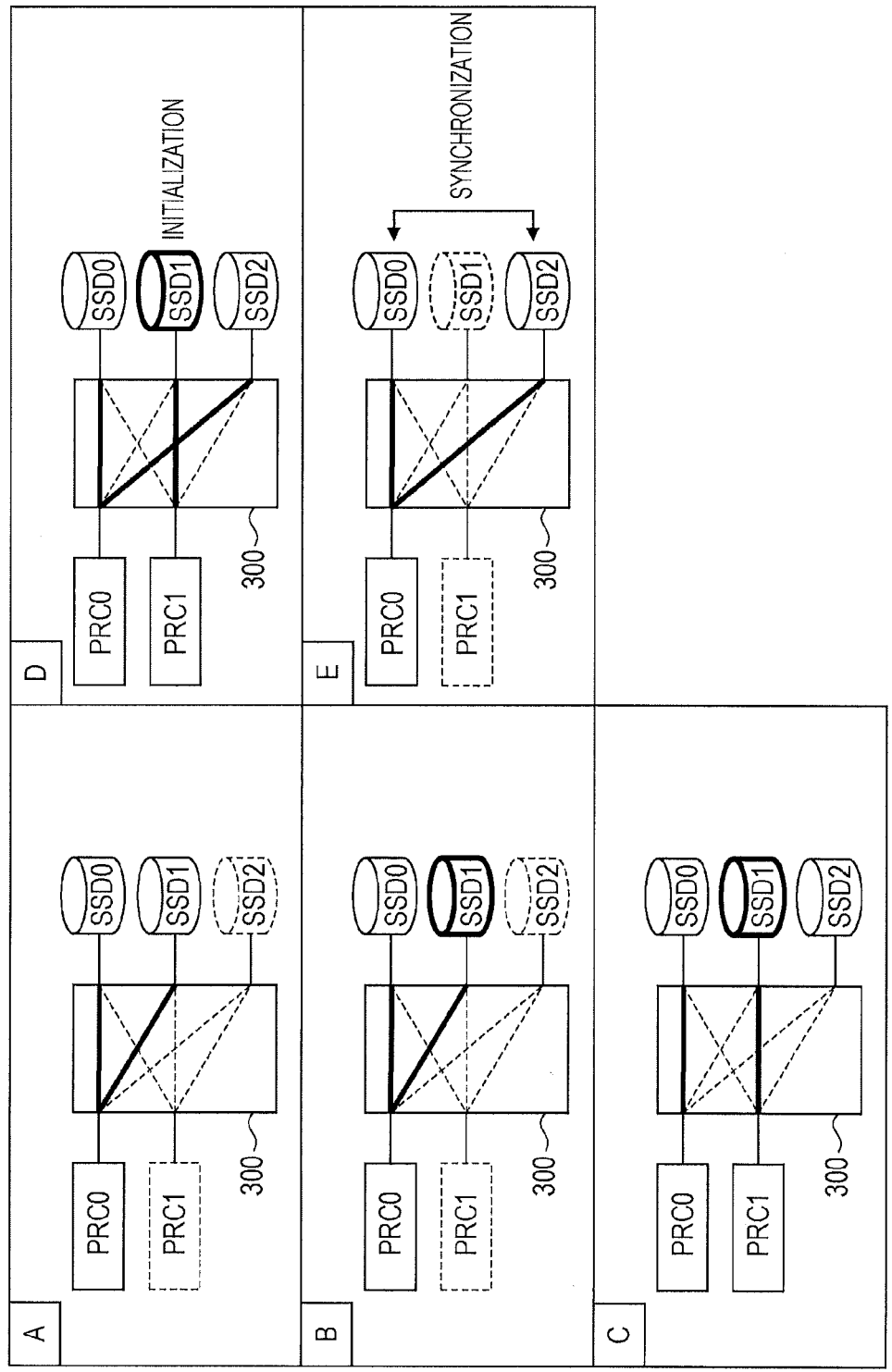
FIG. 2 is a diagram illustrating an example of the operation of the information processing device illustrated in FIG. 1.

FIG. 2 is a diagram illustrating an example of the operation of the information processing device illustrated in FIG. 1. FIG. 2 illustrates an example of a method for controlling an information processing device and the method is implemented by executing a control program by the processor provided in the control section 400. A state A, a state B, a state C, a state D, and a state E illustrate change with time of the connection section 300 that connects the processors PRC with the storage devices SSD. Note that, in FIG. 2, for simplification, it is assumed that the processor pool 100 illustrated in FIG. 1 includes two processors PRC0 and PRC1, the memory pool 200 illustrated in FIG. 1 includes three storage devices SSD0, SSD1, and SSD2. In this embodiment, a system is constructed by a single processor PRC and two storage devices SSD that redundantly maintain data.

The processor PRC represented by a dashed line is an unused processor PRC that is not constructed as a system. In the state B, the state C, and the state D, the storage device SSD represented by a dashed line is an unused storage device SSD that is not constructed as a system. For example, the unused storage device SSD has been initialized in advance and has a performance that exceeds a predetermined performance level. Each of bold solid lines in the connection section 300 indicates that the corresponding processor PRC and the corresponding storage device SSD are connected to each other and a system has been constructed. The storage device SSD represented by the bold solid line is a storage device SSD for which reduction in performance has been detected.

The state A represents a state in which a system is constructed by the processor PRC0 and the storage devices SSD0 and SSD1. For example, the system operates as a user system, such as a web server, a database, a data processing device and so forth, which performs communication using a hyper text transfer protocol (HTTP), by executing the user program by the processor PRC0. The same data is redundantly written in the storage devices SSD0 and SSD1. A redundant arrays of independent disks 1 (RAID1) system that performs mirroring of data is constructed by the storage devices SSD0 and SSD1.

The system is constructed by connecting the processor PRC0 and the storage devices SSD0 and SSD1 to each other by the connection section 300 on the basis of the connection specification CS transmitted from the control section 400 illustrated in FIG. 1. The processor PRC (that is, PRC0 in this example) that executes the detection program monitors the access status of each of the storage devices SSD0 and SSD1 included in the system.

The state B represents a state in which the processor PRC0 has detected reduction in performance of the storage device SSD1. The processor PRC0 notifies the control section 400 illustrated in FIG. 1 of the information MID indicating the storage device SSD1 whose performance has been reduced.

In the state C, the control section 400 changes the connection specification CS on the basis of the information MID. The connection section 300 cuts out the storage device SSD1 from the system on the basis of the changed connection specification CS, and connects the cut-out storage device SSD1 to the unused processor PRC1, thereby constructing a virtual system.

In the state D, the control section 400 changes the connection specification CS, and the connection section 300 connects the unused storage device SSD2 to the processor PRC0 on the basis of the changed connection specification CS. That is, a system is reconstructed by the processor PRC0 and the storage devices SSD0 and SSD2. Also, the control section 400 notifies the processor PRC1 in the virtual system of an initialization request for initializing the cut-out storage device SSD1. In response to the initial request, the processor PRC1 executes an initialization program to initialize the storage device SSD1.

In the state E, the control section 400 changes the connection specification CS, and the connection section 300 releases the connection of the processor PRC1 and the storage device SSD1 on the basis or the changed connection specification CS to cancel the construction of the virtual system. That is, the processor PRC1 is returned to the processor pool 100, and the storage device SSD1 is returned to the memory pool 200 as an unused storage device SSD having a performance higher than the predetermined performance level. Also, the control section 400 synchronizes each of the storage devices SSD1 and SSD2 with the processor PRC1 to reconstruct the RAID1 system and thus causes the storage devices SSD1 and SSD2 to redundantly maintain data.

Figure 3:
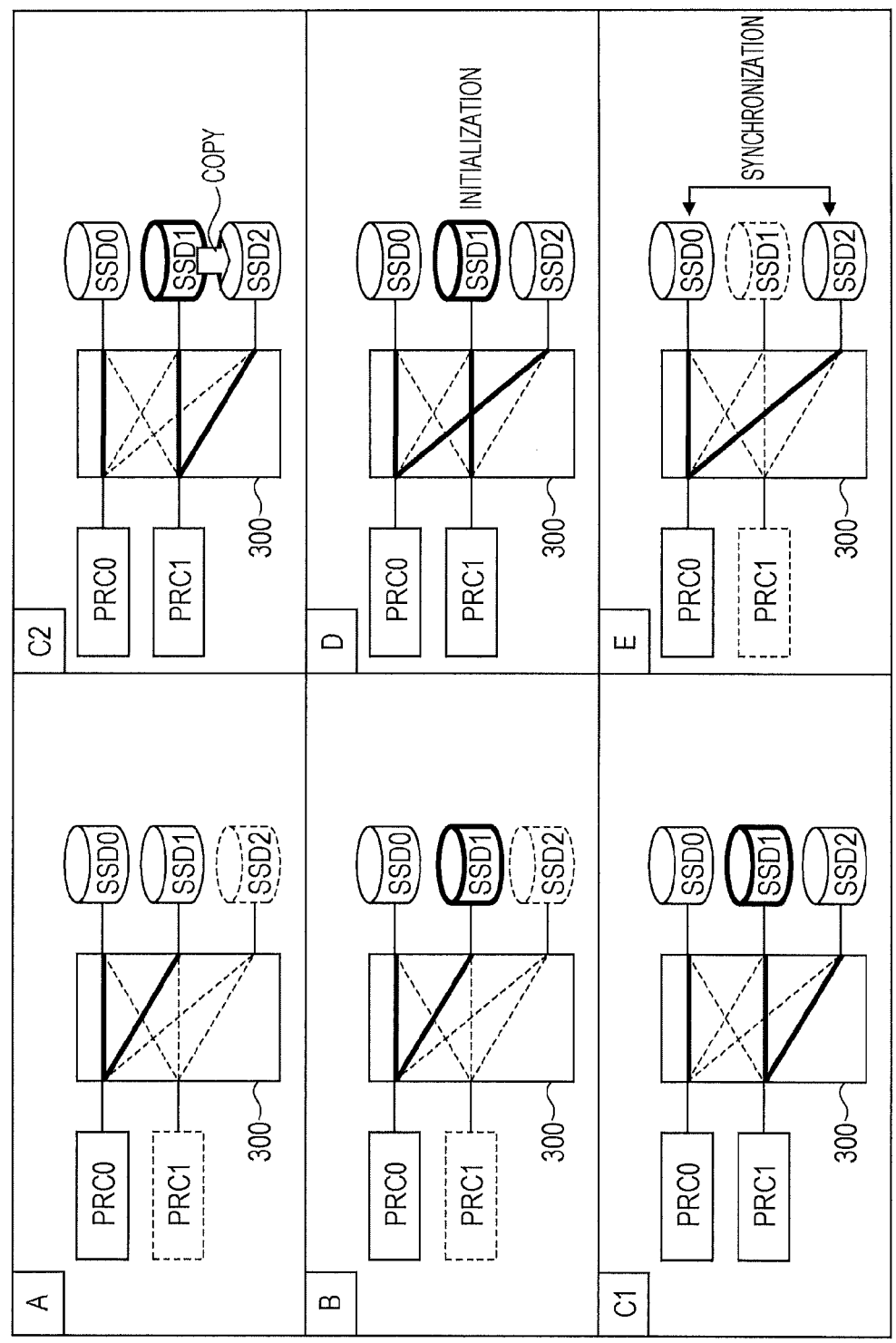
FIG. 3 is a diagram illustrating another example of the operation of the information processing device illustrated in FIG. 1.

FIG. 3 is a diagram illustrating another example operation of the information processing device illustrated in FIG. 1. The detail description of an operation that is similar to or the same as that in FIG. 2 will be omitted. In this example, instead of the state C illustrated in FIG. 2, there are states C1 and C2. The state A, the state B, the state D, and the state E are similar to or the same as those in FIG. 2. FIG. 3 illustrates an example of a method for controlling an information processing device, and the method is implemented by executing a different control program from the control program, which executes the operation of FIG. 2, by the processor in the control section 400.

In the state C1, the control section 400 changes the connection specification CS, and the connection section 300 cuts out the storage device SSD1 from the processor PRC0. Also, the connection section 300 connects the cut-out storage device SSD1 and the unused storage device SSD2 to the unused processor PRC1, thereby constructing a virtual system.

In the state C2, the control section 400 notifies the processor PRC1 in the virtual system of information indicating the storage device SSD1 whose performance has been reduced and the unused storage device SSD2 and a copy request for copying data. The processor PRC1 receives the copy request transmitted from the control section 400, executes a copy program, and copies data stored to the storage device SSD1 whose performance has been reduced to the unused storage device SSD2.

Copy of data is executed using the virtual system including the unused processor PRC1, and thus, the load of the user system is not increased by copying data. Also, data is copied using the processor PRC 1 before synchronizing data in the state E, and thus, at least a part of data stored in the storage device SSD0 and data stored in the storage device SSD2 may be synchronized in advance. Thus, synchronization of data performed by the processor PRC0 in the state E may be simplified, as compared to the case where synchronization of data is executed using the storage device SSD2 in an initialized state, and increase in load of the user system may be reduced.

As described above, in this embodiment, when reduction in performance in one of the storage devices SSD that redundantly maintain data is detected, the performance of the storage devices SSD in the system may be recovered by replacing one of the storage devices SSD, whose performance has been reduced, with an unused one of the storage devices SSD. In this case, by constructing a virtual system, one of the storage-devices SSD, whose performance has been reduced, may be initialized while increase in load of the processor PRC in the system is reduced, or data in one of the storage devices SSD, whose performance has been reduced, may be copied to an unused one of the storage devices SSD. Thus, the usability of the processor PRC provided in the processor pool 100 may be increased by canceling the construction of the virtual system after connecting to the storage device SSD2 to the processor PRC0 and returning the processor PRC1 to the processor pool 100.

Figure 4:
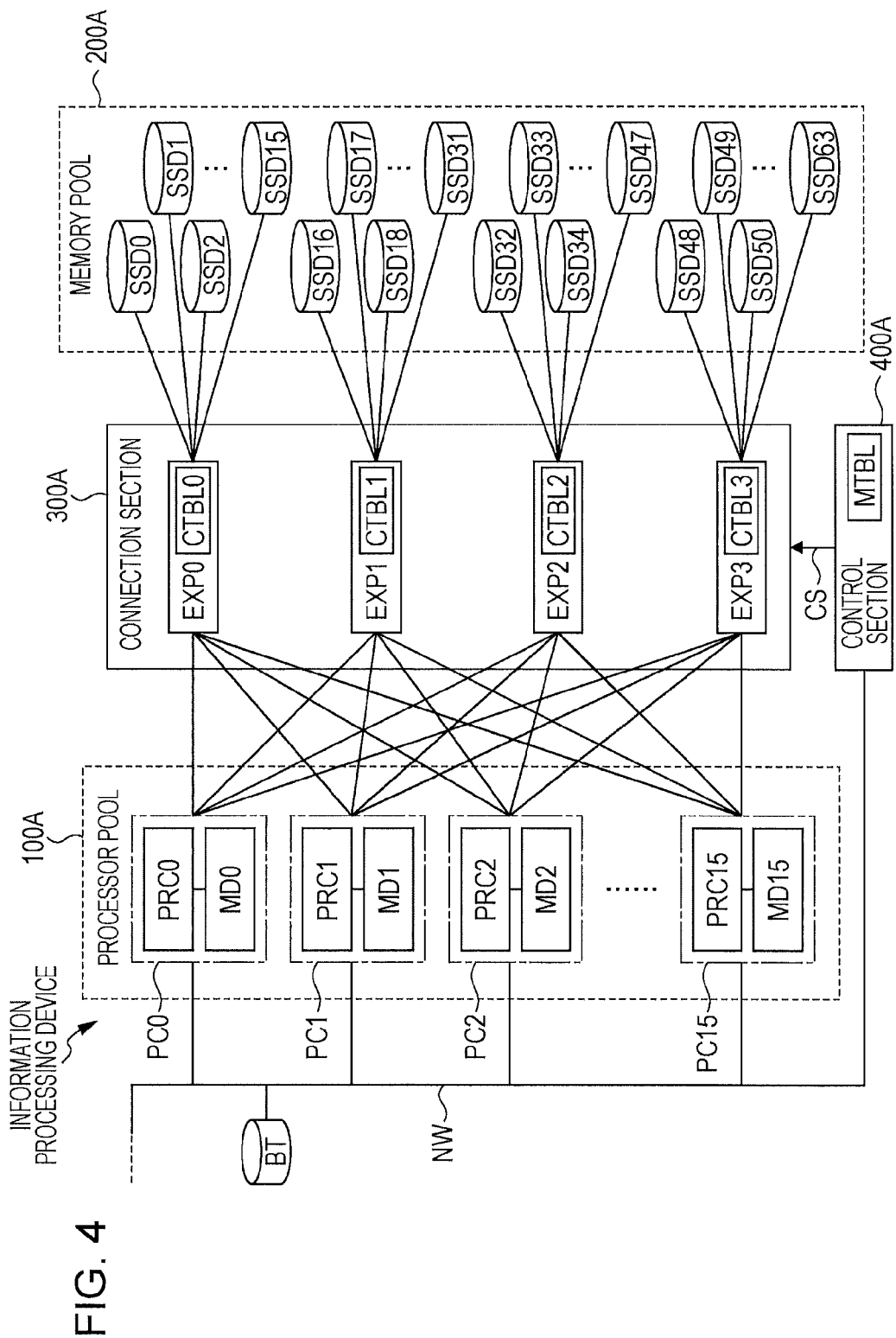
FIG. 4 is a diagram illustrating an example of an information processing device according to another embodiment.

FIG. 4 is a diagram illustrating an example of an information processing device according to another embodiment. In FIG. 4, those parts which are similar to or the same as those corresponding parts in FIG. 1 will be identified by the same reference characters, and therefore, the detail description thereof will be omitted. In this embodiment, an information processing device includes a processor pool 100A, a memory pool 200A, a connection section 300A, a control section 400A, and a storage device BT.

The processor pool 100A includes a plurality of computer devices PC (PC0, PC1, PC2, . . . , and PC15). Each of the computer devices PC includes processors PRC (PRC0, PRC1, PRC2, . . . , and PRC15), such as CPUs and so forth, and storage devices MD (MD0, MD1, MD2, . . . , and MD15), such as memory modules and so forth. For example, a memory module is a dual inline memory module (DIMM) including a dynamic random access memory (DRAM) chip.

In this example, the processor pool 100A includes 16 computer devices PC, but the number of the computer devices PC may be two or more.

Each of the computer devices PC is operated by executing a program stored in the corresponding storage device MD by the corresponding processor PRC. For example, programs stored in the storage device MD are an operating system, a management program, and a user program. The management program includes the detection program, the initialization program, and the copy program that have been described with reference to FIG. 2 and FIG. 3. For example, the management program uses a command of the operating system to detect reduction in performance of the storage device SSD and initialize the storage device SSD, or copy data of the storage device SSD whose performance has been reduced to the unused storage device SSD.

Then, a predetermined number of ones of the computer devices PC are connected to a predetermined number of ones of the storage devices SSD via the connection section 300A, and thus, a system that may execute the user program is constructed. By executing the user program, each system operates as a web server, a data base, a data processing device, or the like. Note that, as will be described later, when the storage device SSD is cut out from the system on the basis of reduction in performance of the storage device SSD, the storage device MD functions as a memory buffer that holds write data until another storage device SSD is connected.

The memory pool 200A includes a plurality of storage devices SSD (SSD0, SSD1, SSD2, . . . , and SSD63). For example, each of the storage devices SSD is a flash storage including a plurality of flash memory chips. Note that, in this embodiment, the memory pool 200A includes 64 storage devices SSD, but the number of the storage devices SSD may be three or more.

The connection section 300A includes expanders EXP (EXP0, EXP1, EXP2, and EXP3. Each of the expanders EXP includes connection management tables CTBL (CTBL0, CTBL1, CTBL2, and CTBL3) indicating a connection specification for connection of the computer devices PC PC0 to PC15 with the 16 storage devices SSD. The connection management tables CTBL are changed in accordance with information for the connection specification CS transmitted from the control section 400A. Then, each of the expanders EXP connects at least one of the computer devices PC1 to PC15 to at least one of the 16 storage devices SSD (for example, SSD0 to SSD15). Examples of the connection management tables CTBL are illustrated in FIG. 7.

For example, each of the computer devices PC and a corresponding one of the expanders EXP are connected with each other via a corresponding one of serial attached SCSI (small computer system interface) (SAS) cables, and each of the storage devices SSD and a corresponding one of the expanders EXP are connected with each other via a corresponding one of the SAS cables. That is, each of the expanders EXP serves a switch that may transmit a SAS protocol between each of the computer devices PC and a corresponding one of the storage devices SSD. Note that each of the computer devices PC and a corresponding one of the expanders EXP may be connected to each other and each of the storage devices SSD and a corresponding one of the expanders EXP may be connected with each other via an interface, such as a serial advanced technology attachment (SATA) and a peripheral component interconnect-express (PCI Express).

The control section 400A includes an entire management table MTBL indicating the connection specification CS for connection of the computer devices PC0 to PC15 provided in the processor pool 100A with all of the storage devices SSD0 to SSD63 provided in the memory pool 200A. An example of the entire management table MTBL is illustrated in FIG. 6. When changing the entire management table MTBL, the control section 400A notifies each of the expanders EXP of the connection section 300A of contents of change as the connection specification CS. Thus, as illustrated in FIG. 6 and FIG. 7, the contents of the entire management table MTBL correspond to the contents of the connection management tables CTBL.

The storage device BT is connected to the computer devices PC0 to PC15 and the control section 400A, for example, via a network NW, such as a local area network (LAN) and so forth. In the storage device BT, an operating system and a management program that may be executed by the processors PRC are stored in advance. When any one of the computer devices PC is connected to a corresponding one of the storage devices SSD on the basis of the connection specification CS, the operating system and the management program are loaded to the storage device MD in the system on the basis of an instruction transmitted from the control section 400A.

For example, the user program that implements the user system, such as a web server and so forth, is loaded to the storage device MD0 via the network NW and is executed by a corresponding one of the processors PRC provided in the system. Thus, the computer devices PC and the storage devices SSD connected together via the connection section 300A is constructed as a system that may execute the user program. Then, the processor PRC in the system executes the management program transmitted to the storage device MD between executions of the user program.

Figure 5:
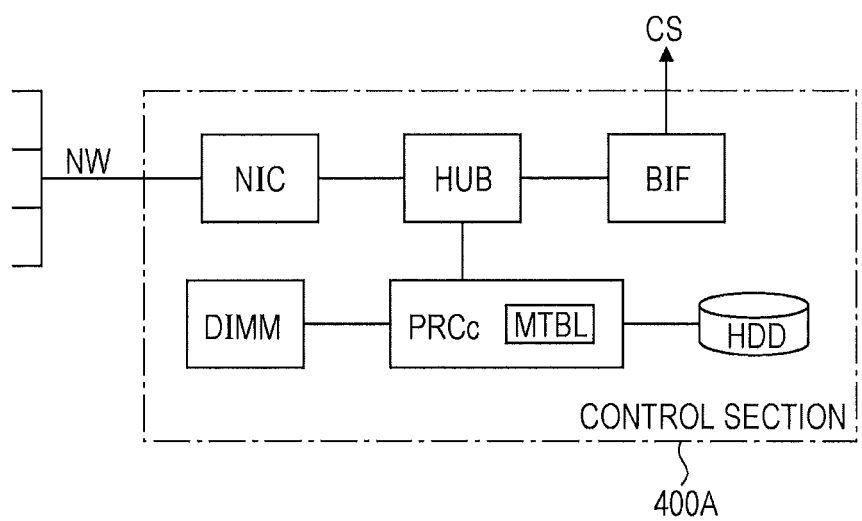
FIG. 5 is a diagram illustrating a control section illustrated in FIG. 4.

FIG. 5 illustrates an example of the control section 400A of FIG. 4. For example, the control section 400A is implemented by a computer device and includes a processor PRCc, such as a CPU and so forth, a memory module DIMM, a hard disk drive HDD, a hub HUB, a network interface card NIC, and a bus interface BIF. Note that the control section 400A may be connected to an input unit, such as a keyboard, a mouse, and so forth, and an output unit, such as a display and so forth.

For example, the processor PRCc executes a control program and generates the entire management table MTBL using a built-in memory mounted in the processor PRCc. The processor PRCc is connected to the network NW via the hub HUB and the network interface card NIC, and is connected to the connection section 300A illustrated in FIG. 4 via the bus interface BIF.

Figure 11:
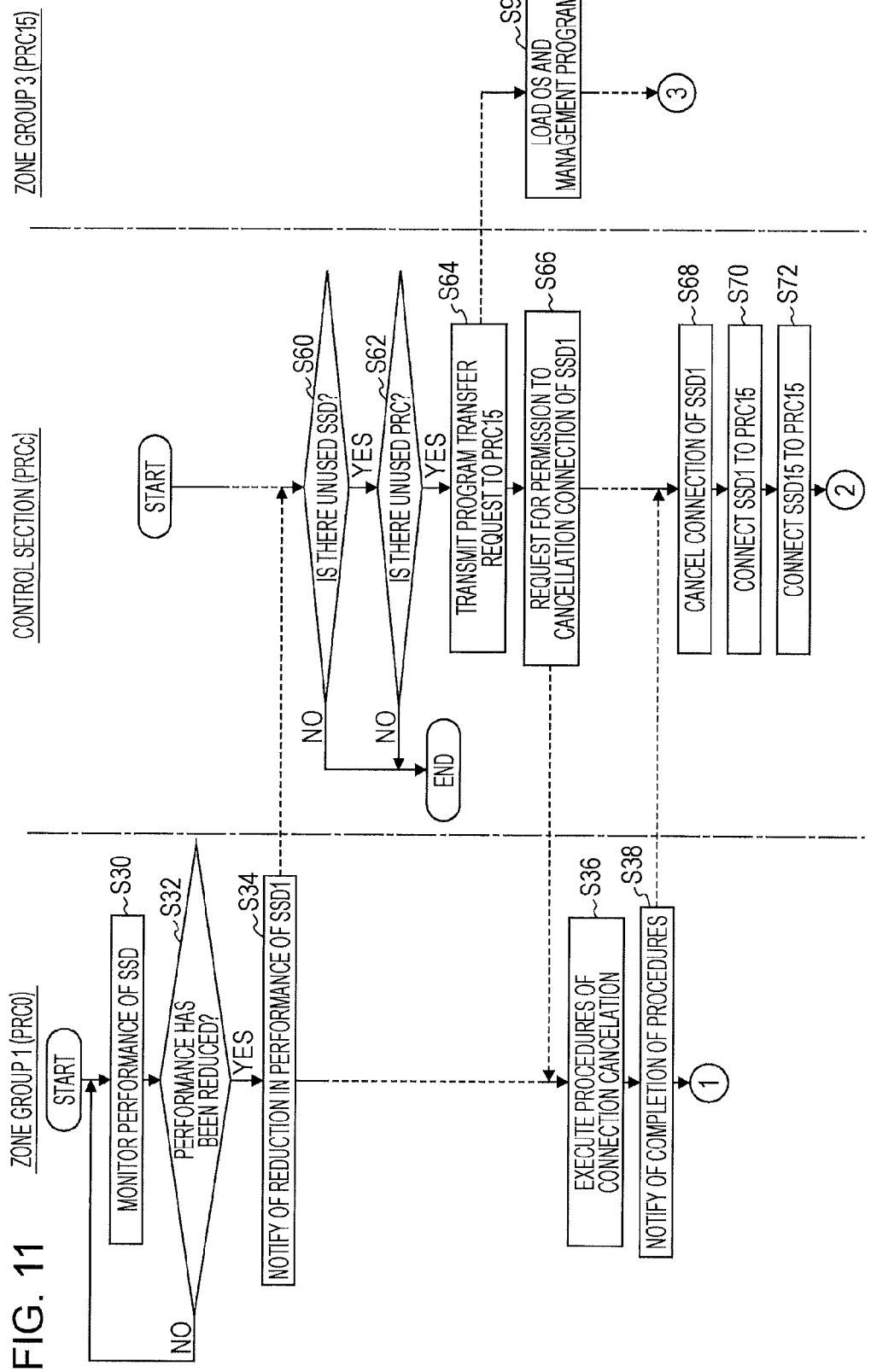
FIG. 11 is a flowchart of an example of the operation of the information processing device illustrated in FIG. 4.
Figure 14:
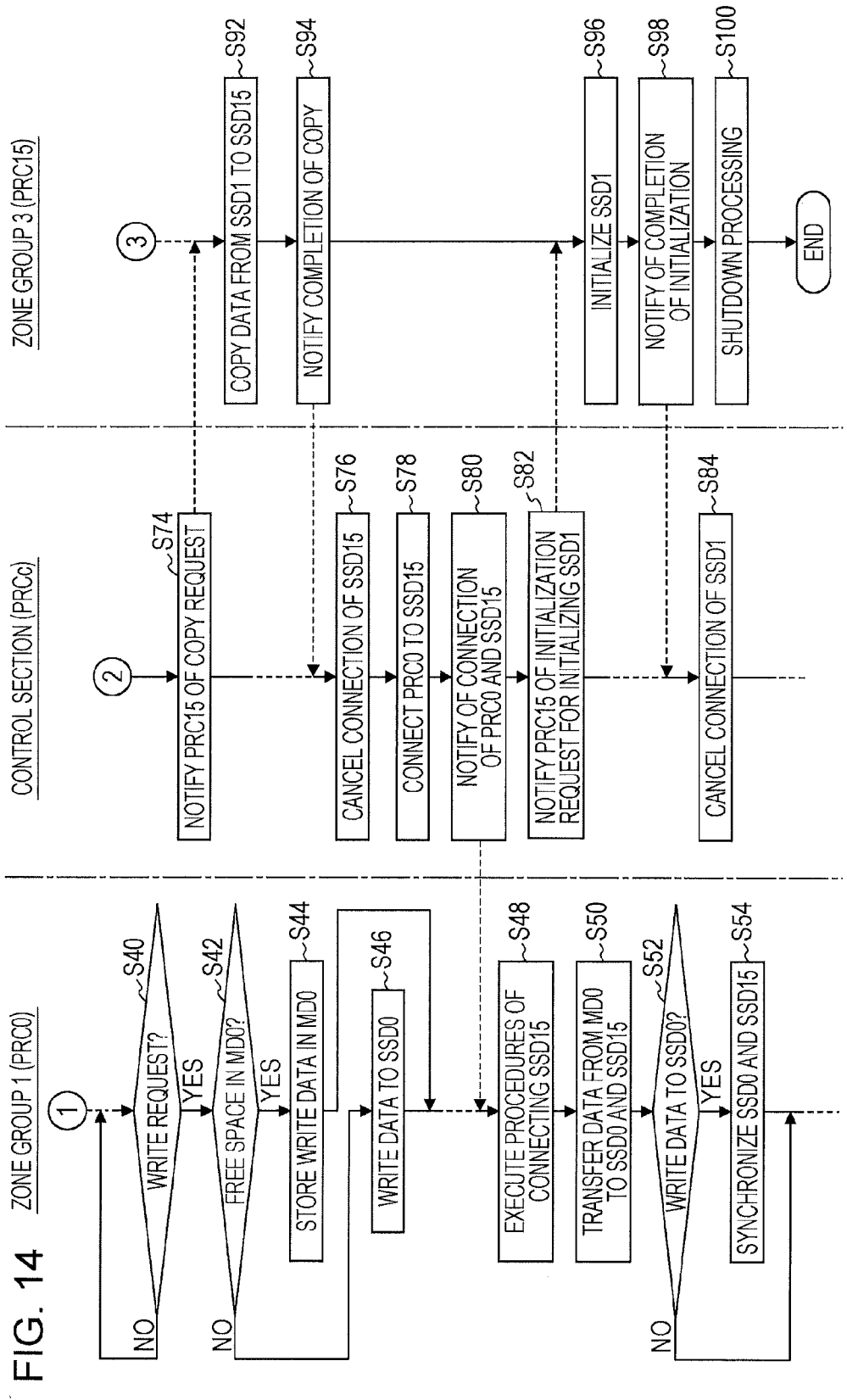
FIG. 14 is a flowchart of an example of the operation of the information processing device illustrated in FIG. 4.

The processor PRCc executes the operations illustrated in FIG. 11 and FIG. 14 by executing the control program stored in the memory module DIMM to implement the function of the control section 400A. For example, the control program is downloaded to the hard disk drive HDD via the network NW in advance, and is copied, when the power of the control section 400A is turned on, to the memory module DIMM from the hard disk drive HDD.

The processor PRCc receives information from the processors PRC provided in the processor pool 100A via the network NW, and outputs the information to the processors PRC. Also, the processor PRCc outputs the connection specification CS that causes a rewrite of the connection management tables CTBL of the connection section 300A via the bus interface BIF.

FIG. 6 is a diagram illustrating an example of the entire management table MTBL of FIG. 4. The entire management table MTBL includes an area that stores information indicating a connection specification for connection of the computer devices PC with the storage devices SSD for each of the computer devices PC. The computer devices PC and the storage devices SSD that are associated with one another by the area in which the same numerical value is stored are mutually connected. The numerical value, such as "1", "2", and so forth indicates a zone group number used for identifying a system zone.

A system is constructed by the computer devices PC and the storage devices SSD that are associated with one another by the same numerical value. A blank area in which the numerical value is not given indicates that a corresponding one of the computer devices PC and a corresponding one of the storage devices SSD are not connected with each other. That is, it is indicated that the computer device PC whose corresponding areas (that is, areas arranged in the right-and-left direction of the FIG. 6) are blank, and the processor PRC and the storage device MD provided in the computer device PC are unused. It is also indicated that the storage device SSD whose corresponding areas (that is, areas arranged in the up-and-bottom direction of FIG. 6) are blank are unused.

For example, the computer device PC0 corresponding to an area in which the numerical value "1" is stored and the storage devices SSD0, SSD1, SSD2, and SSD3 belong to a system of the zone group 1, and are mutually connected via the expander EXP0 illustrated in FIG. 4. For example, the system of the zone group 1 is a web server. The computer devices PC1 and PC2 corresponding to areas in which the numerical value "2" is stored and the storage devices SSD16 and SSD17 belong to a system of the zone group 2 and are mutually connected by the expander EXP1 illustrated in FIG. 4. For example, the system of the zone group 2 is a database.

In this embodiment, a pair of the storage devices SSD (for example, SSD0 and SSD1) of each of the zone groups 1 and 2 receives the same write data, redundantly holds data, and operates as a single storage device SSD. That is the RAID1 system is constructed by a pair of the storage devices SSD.

FIG. 7 is a diagram illustrating examples of the connection management tables CTBL0 to CTBL3 of FIG. 4. The connection management tables CTBL0, CTBL1, CTBL2, and CTBL3 are provided so as to correspond to the expanders EXP0, EXP1, EXP2, and EXP3, respectively. Each of the connection management tables CTBL0 to CTBL3 includes the same areas as those of the entire management table MTBL illustrated in FIG. 6. In other words, the connection management table CTBL0 includes areas corresponding to the storage devices SSD0 to SSD15, the connection management table CTBL1 includes areas corresponding to the storage devices SSD16 to SSD31, the connection management table CTBL2 includes areas corresponding to the storage devices SSD32 to SSD47, and the connection management table CTBL3 includes areas corresponding to the storage devices SSD48 to SSD63.

The control section 400A illustrated in FIG. 4 outputs the information of the entire management table MTBL as the connection specification CS to each of the expanders EXP, and rewrites each of the connection management tables CTBL0 to CTBL3. Note that, in FIG. 7, for simplification, illustrated parts of the connection management tables CTBL0 and CTBL1 are larger than those of the connection management tables CTBL2 and CTBL3. But the connection management tables CTBL0 to CTBL3 have the same size.

Note that, depending one cases, each of the expanders EXP does not include the connection management tables CTBL and connects a corresponding one of the computer devices PC to a corresponding one of the storage devices SSD by referring to the entire management table MTBL illustrated in FIG. 6.

Figure 8:
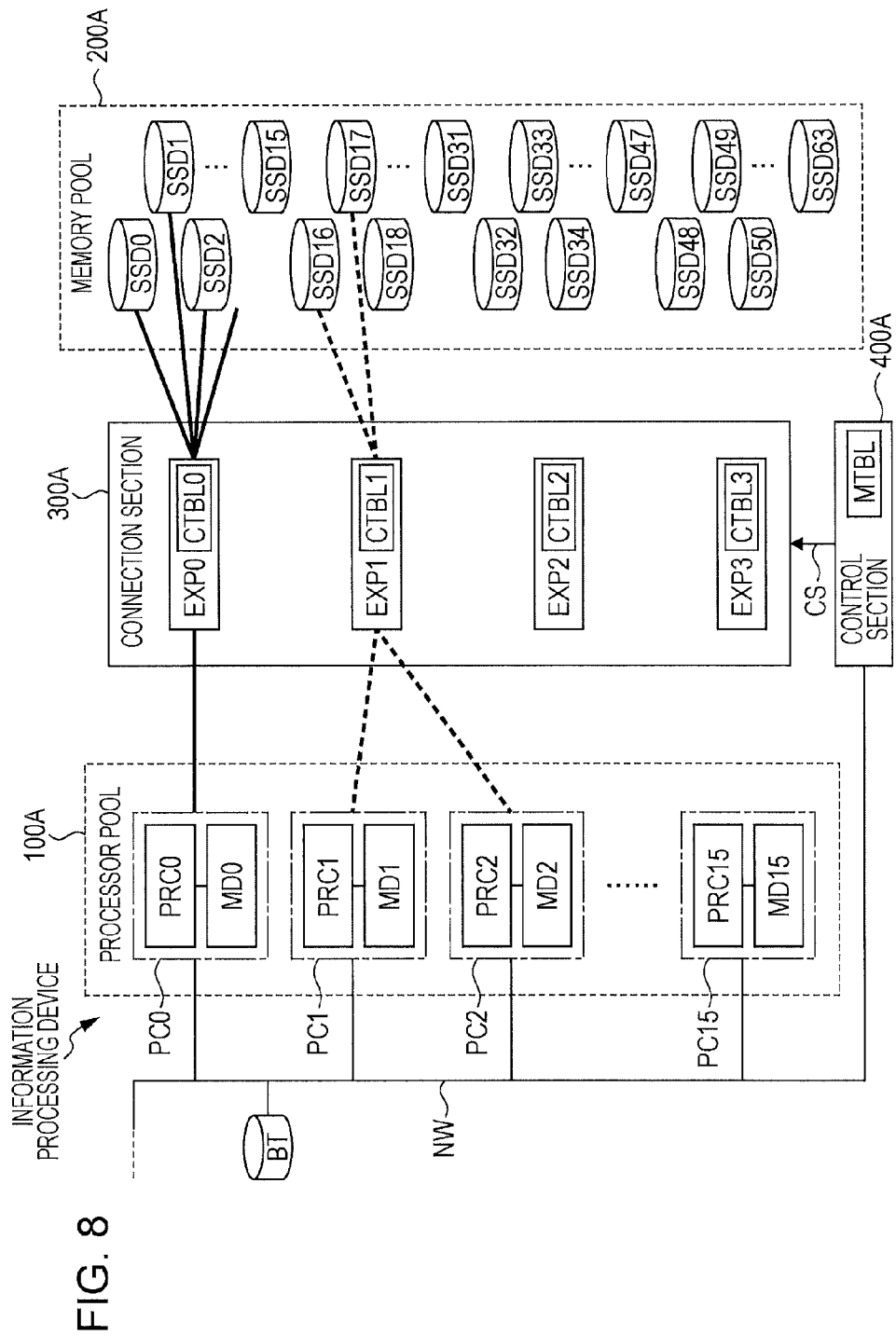
FIG. 8 is a diagram illustrating an example of connections in the information processing device illustrated in FIG. 4.

FIG. 8 is a diagram illustrating an example of connections in the information processing device illustrated in FIG. 4. In FIG. 8, each of the expanders EXP connects a corresponding one of the computer devices PC to a corresponding one of the storage devices SSD in accordance with the values stored in the connection management tables CTBL illustrated in FIG. 7. In FIG. 8, the bold solid lines indicate connections of the zone group 1 represented by the numerical value "1" in FIG. 6 and FIG. 7, and the bold dashed lines indicate connections of the zone group 2 represented by the numerical value "2" in FIG. 6 and FIG. 7. Cables connecting the computer devices PC and the storage devices SSD that are not connected via the expanders EXP are not illustrated.

In this example, the computer device PC0 and the storage devices SSD0, SSD1, SSD2, and SSD3 that belong to the zone group 1 are connected with one another, thereby constructing a system. Also, the computer devices PC1 and PC2 and the storage devices SSD16 and SSD 17 that belong to the zone group 2 are connected to one another, thereby constructing a system.

Figure 9:
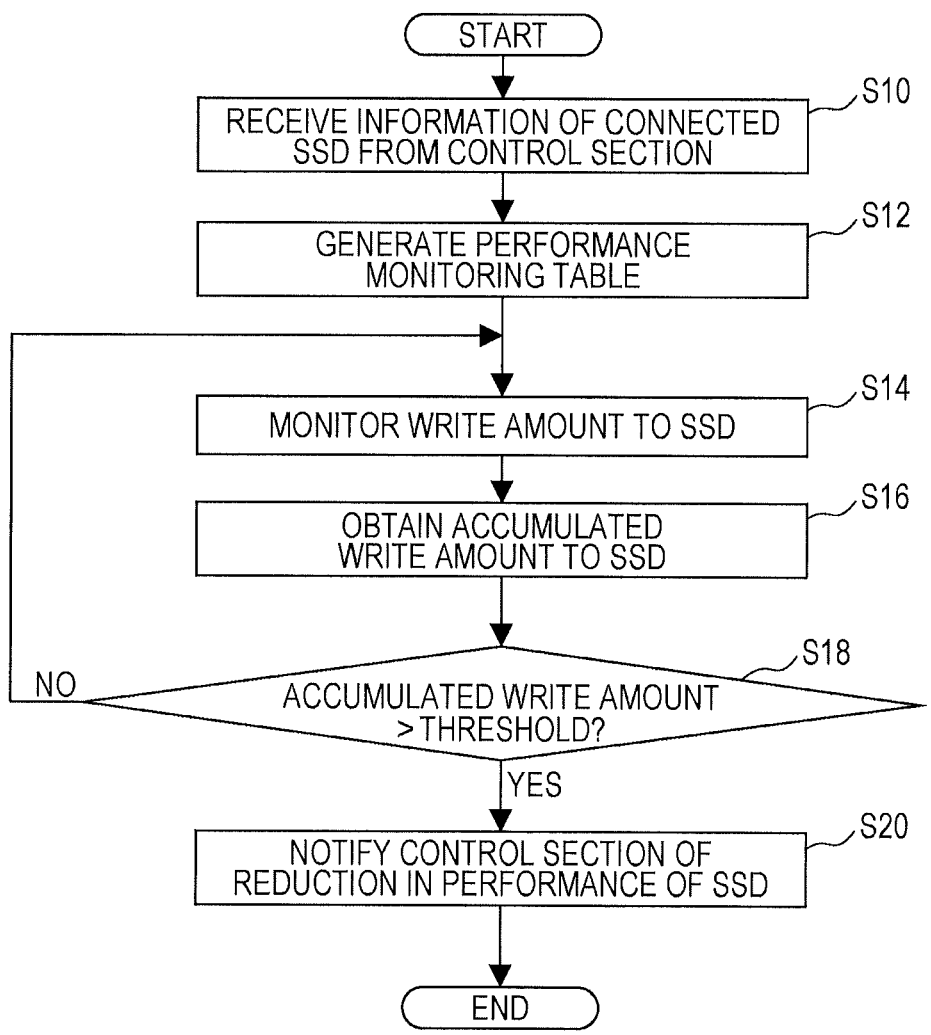
FIG. 9 is a flowchart of an example of detection of reduction in performance of a storage device performed by a processor illustrated in FIG. 4.

FIG. 9 is a flowchart of an example of detection of reduction in performance of the storage device SSD performed by the processor PRC illustrated in FIG. 4. The flow illustrated in FIG. 9 is implemented by executing the management program by the processor PRC in the constructed system. For example, Steps S10 and S12 are executed after a system is constructed and before the user program that implements the function of the system is started. For example, Steps S14, S16, S18, and S20 are executed every several seconds or every several minutes between executions of the user program.

First, in Step S10, the processors PRC receive information regarding the corresponding storage device SSD connected thereto from the control section 400A via the network NW. For example, the processor PRC0 illustrated in FIG. 8 receives connection information of the storage devices SSD0, SSD1, SSD2, and SSD3. The processor PRC1 (or PRC2) of FIG. 8 included in the multiprocessor system receives connection information of the storage devices SSD16 and SSD17. In the multiprocessor system, one of the processors PRC executes the flow illustrated in FIG. 9.

Next, in Step S12, the processor PRC in the system generates a performance monitoring table used for monitoring the performance of the storage devices SSD connected thereto. Examples of the performance monitoring table is illustrated in FIG. 10.

In Step S14, the processor PRC monitors the data write amount of data written to each of the storage devices SSD connected thereto. For example, the processor PRC monitors the data write amount using a command for collecting statistic information provided in the operating system. When the operating system is Linux (registered trademark), a system admin reporter (sar) command may be used.

In Step S16, the processor PRC sequentially adds up the monitored write amounts and obtains an accumulated write amount. In Step S18, the processor PRC determines whether or not the accumulated write amount has exceeded a threshold. If the accumulated write amount has not exceeded the threshold, the operation of the processor PRC returns to the operation of Step S14. If the accumulated write amount has exceeded the threshold, the processor PRC determines that the performance of the corresponding storage device SSD has been reduced, and executes the operation of Step S20. In Step S20, the processor PRC notifies the control section 400A of the number of the storage device SSD whose performance has been reduced.

As described above, in the flash storage in which data of an amount exceeding a predetermined amount is written, an erase operation easily occurs in response to a write request for writing data, and the throughput of data write is reduced. In this embodiment, by monitoring the accumulated write amount of the data, reduction in the throughput of data write may be indirectly detected, and thus, reduction in performance of the storage device SSD may be detected.

FIG. 10 is a diagram illustrating examples of the performance monitoring table generated by Step S12 illustrated in FIG. 9. The performance monitoring table is generated for each zone group. Each of the performance monitoring tables includes, for each storage device SSD that belongs to a zone group, an area in which a total capacity, an initial used capacity that indicates a capacity used when a system is constructed, a threshold, and an accumulated write amount for the storage device SSD are stored.

For example, the total capacity of each of the storage devices SSD is 120 gigabytes, the initial used capacity is 0 gigabyte, and the threshold is 180 gigabyte. The accumulated write amounts of the storage devices SSD0, SSD1, SSD2, and SSD3 at a certain point after the zone group 1 has been constructed are, for example, 10 gigabytes, 80 gigabytes, 20 gigabytes, and 5 gigabytes, respectively. The accumulated write amounts of the storage devices SSD16 and SSD17 at a certain point after the zone group 2 has been constructed are, for example, 30 gigabytes and 50 gigabytes, respectively.

Note that the performance monitoring table of the zone group 2 is generated and managed by the processor PRC1 and the processor PRC2. For example, when the processor PRC1 manages the performance monitoring table, the processor PRC1 requests the processor PRC2 to notify the processor PRC1 of the data write amount of data written to the storage devices SSD16 and SSD17 with predetermined frequency. In response to the request made by the processor PRC1, the processor PRC2 obtains the data write amount of data written to the storage devices SSD16 and SSD17 and notifies the processor PRC1 of the data write amount. On the other hand, when the processor PRC2 manages the performance monitoring table, the processor PRC1 obtains, in response to the request made by the processor PRC2, the data write amount of data written to the storage devices SSD16 and SSD17 and notifies the processor PRC2 of the data write amount.

FIG. 11 is a flowchart of an example of the operation of the information processing device illustrated in FIG. 4. An initial state after a system is constructed is illustrated in the entire management table MTBL of FIG. 6, the connection management tables CTBL illustrated in FIG. 7 and FIG. 8. In the flow of FIG. 11, the dashed lines extending in the up—and bottom direction (for example, the dashed line connecting Steps S34 and S36) indicate that an operation other than the noted operation is executable.

FIG. 11 illustrates an example in which reduction in performances of the storage device SSD that belong to the zone group 1 is detected, a new zone group 3 is constructed, and the storage device SSD whose performance has been reduced is recovered. For example, the flow for the zone group 1 is implemented by executing the management program by the processor PRC0, and the flow for the zone group 3 is implemented by executing the management program by the processor PRC15. The flow of the control section 400A is implemented by executing the control program by the processor PRCc (FIG. 5) of the control section 400A. That is, Steps S60, S62, S64, S66, S68, S70, and S72 illustrate an example of a method for controlling an information processing device.

First, in Step S30, the processor PRC0 monitors the performances of the storage devices SSD0 to SSD3 that belong to the zone group 1. For example, in Step S30, Steps S14 and S16 illustrated in FIG. 9 are executed. Next, in Step S32, when reduction in the performances of the storage devices SSD0 to SSD3 is detected, the processor PRC0 shifts its operation to Step S34. When reduction in the performances of the storage devices SSD0 to SSD3 is not detected, the processor PRC0 shifts its operation to Step S30. For example, Step S32 is an operation corresponding to Step S18 illustrated in FIG. 9.

In Step S34, the processor PRC0 notifies the control section 400A of information of the storage device SSD (SSD1 in this example) for which reduction in performance has been detected via the network NW. For example, Step S34 is an operation corresponding to Step S20 illustrated in FIG. 9.

In Step S60, the control section 400A that has received the notice from the processor PRC0 detects whether or not there is an unused storage device SSD in the memory pool 200A by referring to the entire management table MTBL illustrated in FIG. 6. If there is an unused storage device SSD, the control section 400A shifts its operation to Step S62 and, if there is no unused storage device SSD, the control section 400A ends its operation.

In Step S62, the control section 400A detects whether or not there is an unused processor PRC by referring to the entire management table MTBL illustrated in FIG. 6. If there is an unused processor PRC, the control section 400A shifts its operation to Step S64 and, if there is no unused processor PRC, the control section 400A ends its operation. Note that the order of Steps S60 and S62 may be interchanged.

If there is no unused processor PRC, interchange of the storage device SSD0 and the storage device SSD15 in the zone group 1 is not executed. In this case, the performance (the data transfer rate of the storage device SSD1) of the system constructing the zone group 1 is reduced. However, reduction in performance of the storage device SSD is not an end of its life or a failure of the storage device SSD, but the storage device SSD whose performance has been reduced normally operates. Also, in this embodiment, a computer device PC exclusively used for executing the processing of replacing the storage device SSD whose performance has been reduced with a new storage device SSD is not ensured in the processor pool 100A. Thus, all of the computer devices PC provided in the processor pool 100A may be used as user systems, and the performance of the information processing device may be increased.

In Step S64, the control section 400A requests, for example, the unused processor PRC15 to transfer the operating system OS and the management program from the storage device BT to the storage device MD15. Note that the control section 400A may select an unused processor PRC other than the processor PRC15 among a plurality of unused processors PRC by referring to the entire management table MTBL.

In Step S90, the processor PRC15 that has received the transfer request executes the initial program and boots the operating system OS from the storage device BT to enable the computer device PC15 to operate. Furthermore, the processor PRC15 downloads the management program from the storage device BT to the storage device MD15. A subsequent operation of the processor PRC15 is illustrated in FIG. 14.

Transfer of the operating system OS and the management program to the storage device MD15 may be executed without using the storage devices SSD, and therefore, it may be started before the zone group 3 is constructed. Note that the control section 400A may execute Step S64 after Step S66. However, since it takes a predetermined time to transfer the operating system OS and the management program, transfer of the operating system OS and the management program is preferably executed after determinations of Steps S60 and S62 are performed.

Also, in the unused computer devices PC in the processor pool 100A illustrated in FIG. 4, before a system is constructed, the operating system OS and the management program may be stored in the storage device MD in advance. In this case, the processing of Step S64 and the processing of Step S90 are not executed.

In Step S66, the control section 400A requests the processor PRC0 to permit releasing of connection of the storage device SSD1 whose performance has been reduced via the network NW. In Steps S36, the processor PRC0 that has received the connection release request executes the procedure of releasing connection of the storage device SSD1 whose performance has been reduced. For example, the processor PRC0 changes the procedure of data write to the storage device SSD and prohibits data write to the storage devices SSD0 and SSD1 of the zone group 1 . Then, the processor PRC0 writes data written by the user program to the storage device MD0, instead of the storage devices SSD0 and SSD1. Next, in Step S38, the processor PRC0 notifies the control section 400A of the completion of the procedure. A subsequent operation of the processor PRC0 is illustrated in FIG. 14.

In Step S68, the control section 400A that has received the notice of the completion of the procedures from the processor PRC0 changes the entire management table MTBL and the connection management table CTBL0 and causes the connection section 300A to release connection of the storage device SSD1 and the processor PRC0. That is, the storage device SSD1 is cut out from the zone group 1.

In Step S70, the control section 400A changes the entire management table MTBL and the connection management table CTBL0 and causes the connection section 300A to connect the processor PRC15 and the storage device SSD1. In Step S72, the control section 400A changes the entire management table MTBL and the connection management table CTBL0 and causes the connection section 300A to connect the processor PRC15 and the storage device SSD15. Thus, the zone group 3 including the processor PRC15 and the storage devices SSD1 and SSD15 is constructed. Note that the control section 400A may change each of the entire management table MTBL and the connection management table CTBL0 once and thereby execute change of connections of the storage devices SSD performed by Steps S68, S70, and S72 with the same timing.

The zone group 3 is a virtual system used for copying data from the storage device SSD1 whose performance has been reduced to the storage device SSD15 and initializing the storage device SSD1. Note that the control section 400A may connect one of a plurality of unused storage devices SSD to the processor PRC15 on the basis of the entire management table MTBL. A subsequent operation of the control section 400A is illustrated in FIG. 14.

Figure 12:
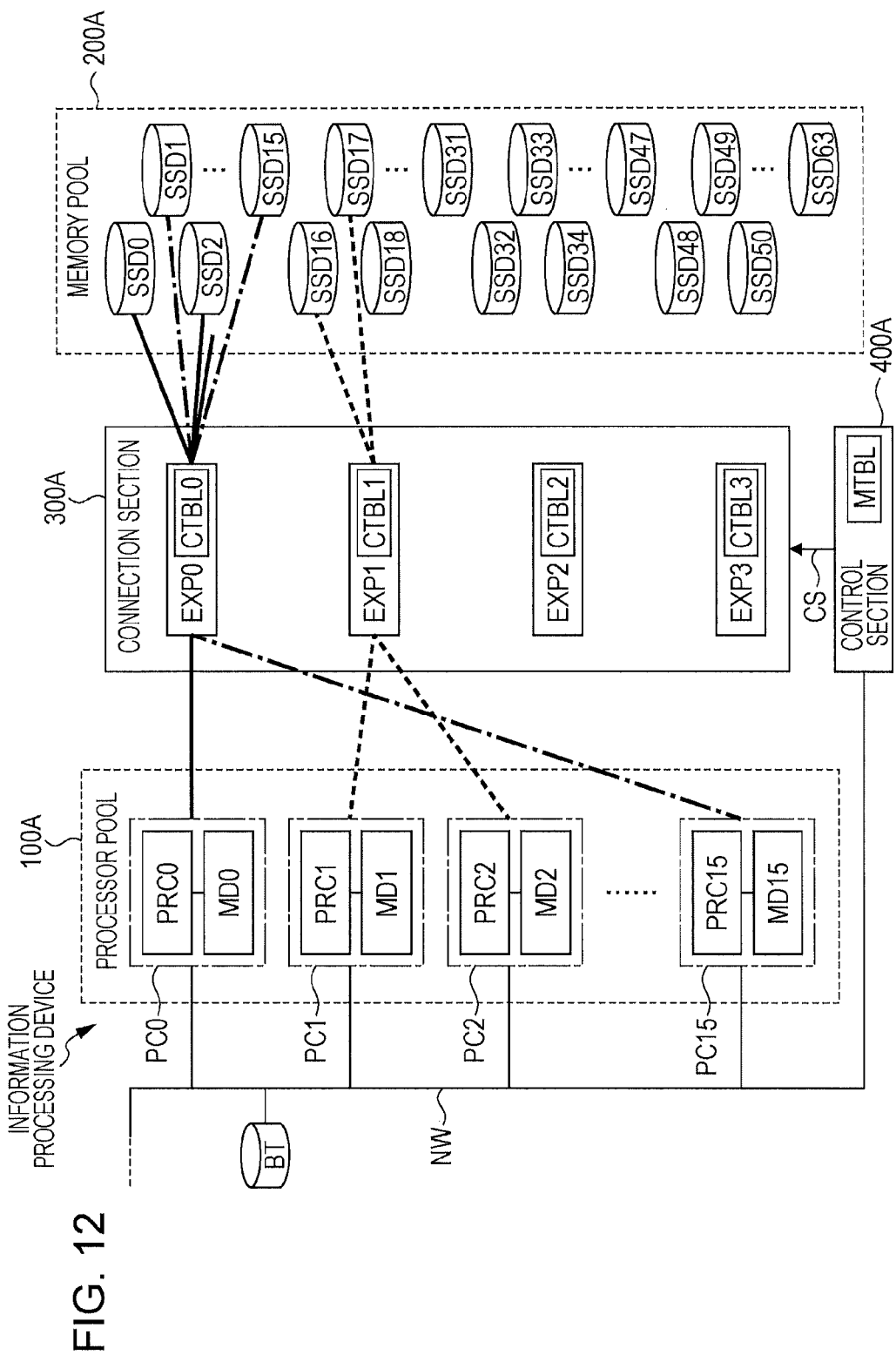
FIG. 12 is a diagram illustrating an example of connections in the information processing device when Step S72 of FIG. 11 is executed.

FIG. 12 is a diagram illustrating an example of connections in the information processing device when Step S72 of FIG. 11 is executed. In FIG. 12, cables connecting the computer devices PC and the storage devices SSD that are not connected via the expanders EXP are not illustrated.

The computer device PC0 and the storage devices SSD0, SSD2, and SSD3 (SSD3 is not shown) that are connected by the bold solid lines belong to the zone group 1. The computer devices PC1 and PC2 and the storage devices SSD16 and SSD17 that are connected by the bold dashed lines belong to the zone group 2. The computer device PC15 and the storage devices SSD1 and SSD15 that are connected by the bold alternate long and short dash lines belong to the zone group 3.

FIG. 13 is an example of the entire management table MTBL when Step S72 of FIG. 11 is executed. The connection management tables CTBL include the same information as that of the entire management table MTBL.

In this example, in the entire management table MTBL, "1" is deleted from an area where the processor PRC0 intersects with the storage device SSD1, and the storage device SSD1 is cut out from the zone group 1. Then, "3" is written in areas where the processor PRC15 intersects with the storage devices SSD1 and SSD15, and the storage device SSD1 is connected to the processor PRC15 as well as the storage device SSD15, thereby constructing a new zone group 3.

FIG. 14 illustrates an example of the operation of the information processing device illustrated in FIG. 4. FIG. 14 illustrates an operation subsequent to the operation of FIG. 11. In the flow of FIG. 14, the dashed lines extending in the up—and bottom direction (for example, the dashed line connecting Steps S46 and S48) indicates that an operation other than the noted operation is executable.

Similar to FIG. 11, for example, the flow for the zone group 1 is implemented by executing the management program by the processor PRC0, and the flow for the zone group 3 is implemented by executing the management program by the processor PRC15. The flow of the control section 400A is implemented by executing the control program by the processor PRCc of the control section 400A. That is, Steps S74, S76, S78, S80, S82, and S84 illustrate an example of a method for controlling an information processing device.

First, in Step S40, when the processor PRC0 receives a write request for performing a write to the storage device SSD by the user program, the processor PRC0 executes the operation of Step S42. In Step S42, if there is a free capacity in the storage device MD0, the processor PRC0 executes the operation of Step S44 and, when there is no free capacity in the storage device MD0, the processor PRC0 executes the operation of Step S46.

In Step S44, the processor PRC0 writes write data associated with the write request to the storage device MD0that functions as a memory buffer. Thus, even after the RAID1 system including the storage devices SSD0 and SSD1 is canceled, write data is not lost, but may be held. In Step S46, when there is no free capacity in the storage device MD0, the processor PRC0 writes write data associated with the write request to the storage device SSD0 that constituted the RAID1 system with the storage device SSD1 for which reduction in performance is determined. Thus, even when there is no free capacity in storage device MD0, write data is not lost, but may be held.

On the other hand, the control section 400A notifies the processor PRC15 of a copy request for copying data from the storage device SSD1 to the storage device SSD15 via the network NW in Step S74. In Step S92, the processor PRC15 that has received the copy request from the control section 400A executes the management program and copies to the storage device SSD15 data stored in the storage device SSD1 whose performance has been reduced. For example, if the operating system is Linux, the management program may execute copying of data using a dd command. In Step S94, the processor PRC15 notifies the control section 400A of the completion of copying via the network NW.

In Step S76, the control section 400A changes the entire management table MTBL and the connection management table CTBL0 and causes the connection section 300A to release connection of the storage device SSD15 and the processor PRC15. Thus, the storage device SSD15 is cut out from the zone group 3 . In Step S78, the control section 400A changes the entire management table MTBL and the connection management table CTBL0 and causes the connection section 300A to connect the processor PRC0 and the storage device SSD15. Thus, the storage device SSD15 is included in the zone group 1.

In Step S80, the control section 400A notifies the processor PRC0 via the network NW that the storage device SSD15 is connected to the processor PRC0. Note that, in FIG. 14, for simplification, Steps S76 and S78 are separated from each other. However, in an actual operation, the connection section 300A may execute Steps S76 and S78 as a single operation in accordance with changes of the entire management table MTBL and the connection management table CTBL0.

In Step S48, the processor PRC0 that has received the notice of connection of the storage device SSD15 executes the procedure of connecting the storage device SSD15. For example, the processor PRC15 executes the procedure of constructing the RAID1 system by the storage devices SSD0 and SSD15. In Step S50, the processor PRC0 transfers data written to the storage device MD0 by the operation of Step S44 to the storage devices SSD0 and SSD15.

In Step S52, the processor PRC0 determines whether or not data has been written in the storage device SSD by Step S46. If data has been written in the storage device SSD0, the processor PRC0 executes the operation of Step S54. If data has not been written in the storage device SSD0, the operation is ended.

In Step S54, the processor PRC0 executes synchronization processing (for example, reconstruction of the RAID1 ) for the storage devices SSD0 and SSD15. By the operations of Steps S50 and S54, when the storage device SSD1 whose performance has been reduced is replaced with the unused storage device SSD15, data redundancy may be ensured, and the reliability of the system may be increased.

On the other hand, in Step S82, the control section 400A notifies the processor PRC15 of an initialization request for initializing the storage device SSD1 via the network NW. In Step S96, the processor PRC15 that has received the initialization request executes initialization of the storage device SSD1. For example, the processor PRC15 that has received the initialization request executes initialization by formatting the storage device SSD1 to erase all data. For example, when the operating system is Linux, the management program may format the storage device SSD1 using a hdparm command. The storage device SSD1 is put into an initial state by formatting, and thus, the frequency of data write associated with an erase operation becomes zero. Thus, when the storage device SSD1 is incorporated in a new system, the throughput of data write is increased.

In Step S98, the processor PRC15 notifies the control section 400A of the completion of initialization of the storage device SSD1 via the network NW. Note that, the operations of Steps S82, S96, and S98 may be executed after Step S94 is executed and before Step S76 is executed.

In Step S100, the processor PRC15 executes shutdown processing of shutting down the computer device PC15. Note that, when the operating system OS and the management program are stored in the storage device MD in advance in the unused computer device PC in the processor pool 100A illustrated in FIG. 4 before a system is constructed, the shutdown processing of Step S100 is not executed.

In Step S84, the control section 400A changes the entire management table MTBL and the connection management table CTBL0 on the basis of the notice of the completion of initialization, and releases connection of the storage device SSD1 and the processor PRC15. Thus, both of the storage devices SSD0 and SSD15 are cut out from the processor PRC15, the processor PRC15 is returned to the processor pool 100A, and the constructed virtual system (the zone group 3 ) is canceled.

Note that initialization of the storage device SSD1 whose performance has been reduced may be executed at the time when the storage device SSD1 is incorporated in a new system. In this case, the operations of Steps S96 and S98 are not executed.

As has been described, also in this embodiment, similar to the information processing device illustrated in FIG. 1, while increase in load of a processor PRC in a system is reduced, a storage device SSD whose performance has been reduced may be replaced with an unused storage device SSD, and the performance of the storage device SSD in the system may be recovered. Also, a constructed virtual system is canceled after data copy processing and initialization processing of initializing the storage device SSD are completed, and thus, the usability of the processors PRC provided in the processor pool 100A may be increased.

Furthermore, even when the performance of one of the storage devices SSD constituting the RAID1 system is reduced and is replaced with an unused storage device SSD, data redundancy may be ensured and the reliability of the system may be increased.

Figure 15:
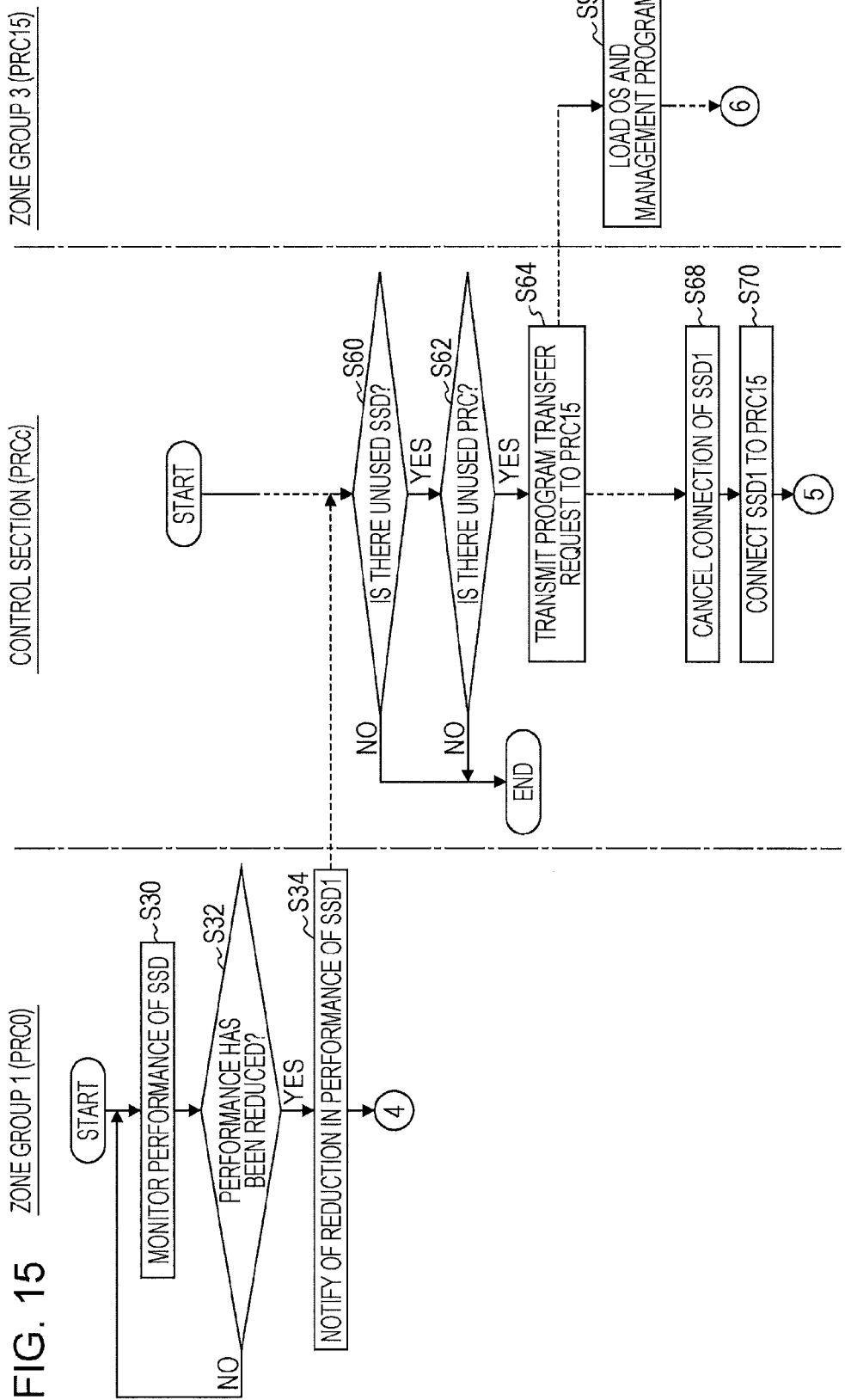
FIG. 15 is a flowchart of an example of the operation of an information processing device according to another embodiment.
Figure 16:
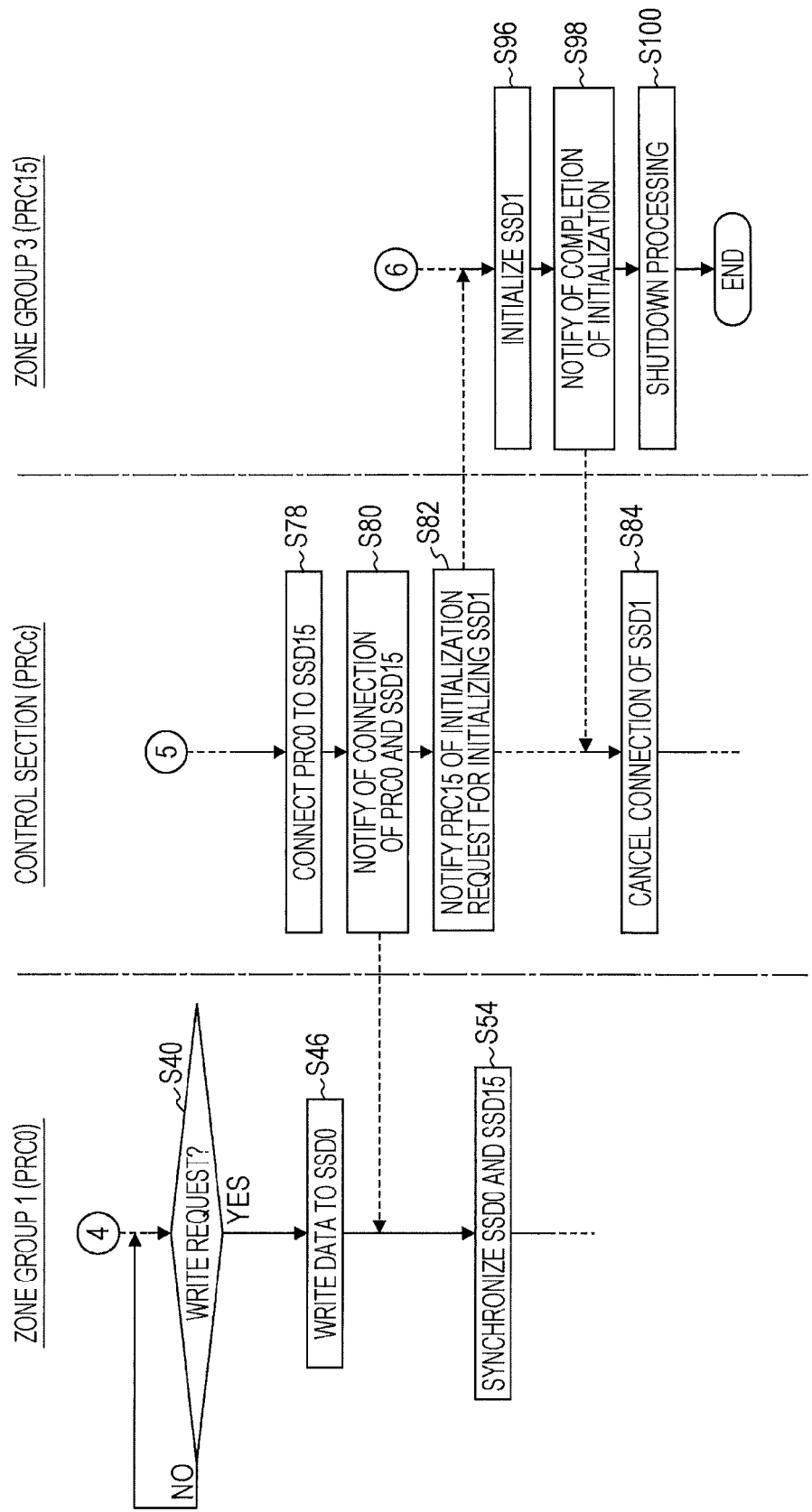
FIG. 16 is a flowchart of an example of the operation subsequent to the operation of the information processing device illustrated in FIG. 15.

FIG. 15 and FIG. 16 illustrate examples of the operation of an information processing device according to another embodiment. The information processing device is different from the information processing device illustrated in FIG. 4 in that the control program executed by the control section 400A and the management program executed by each processor PRC are different from those executed in the information processing device of FIG. 4. Also, in this embodiment, a RAID5 system or a RAID6 system is constructed by a plurality of storage devices SSD included in a system. The configurations of other components of the information processing device are similar to those of the information processing device illustrated in FIG. 4. An entire management table MTBL, connection management tables CTBL, and a performance monitoring table according to this embodiment are similar to or the same as those illustrated in FIG. 6, FIG. 7, and FIG. 10.

When the RAID5 system is employed, an error of read-out data that has occurred in one of the storage devices SSD in the system may be corrected and, when the RAID6 system is employed, errors of read-out data that have occurred in two of the storage devices SSD in the system may be corrected.

Therefore, even when one of the storage devices SSD in the system is cut out from the system in accordance with reduction in performance thereof, the processor PRC in the system does not hold write data in the storage device MD. The processor PRC in the system does not copy data stored in the storage device SSD whose performance has been reduced to an unused one of the storage devices SSD. The unused storage device SSD is not connected to an unused one of the processors PRC but is connected to the processor PRC incorporated in the system. Synchronization for data in the normal storage device SSD whose performance has not been reduced and the unused storage device SSD is executed by reconstruction processing of reconstructing the RAID5 system or the RAID6 system.

Therefore, as illustrated in FIG. 15, the control program executed by the control section 400A does not execute Steps S66 and S72 illustrated in FIG. 11. The management program executed by each processor PRC does not execute Steps S36 and S38 illustrated in FIG. 11. The operation illustrated in FIG. 15 is similar to or the same as the operation illustrated in FIG. 11, except that Steps S66, S72, S36, and S38 are not executed. That is, the processor PRC (for example, PRC0) executes the operation illustrated in FIG. 9 and detects reduction in performance of the storage device SSD on the basis of the accumulated data write amount in the performance monitoring table illustrated in FIG. 10. On the basis of that the performance of the storage device SSD has been reduced, if there is an unused storage section SSD and an unused processor PRC, the control section 400A replaces the storage device SSD whose performance has been reduced with the unused storage device SSD.

In FIG. 16, the control program executed by the control section 400A does not execute Steps S74 and S76 illustrated in FIG. 14. The management program executed by each processor PRC does not execute Steps S42, S44, S48, S50, S52, S92, and S94. The operation illustrated in FIG. 16 is similar to or the same as the operation illustrated in FIG. 14 except that Steps S74 and S76 and Steps S42, S44, S48, S50, S52, S92, and S94 are not executed. That is, the processor PRC (for example, PRC15) in a virtual system initializes the storage device SSD whose performance has been reduced and, after the initialization is completed, the constructed virtual system is canceled.

Figure 17:
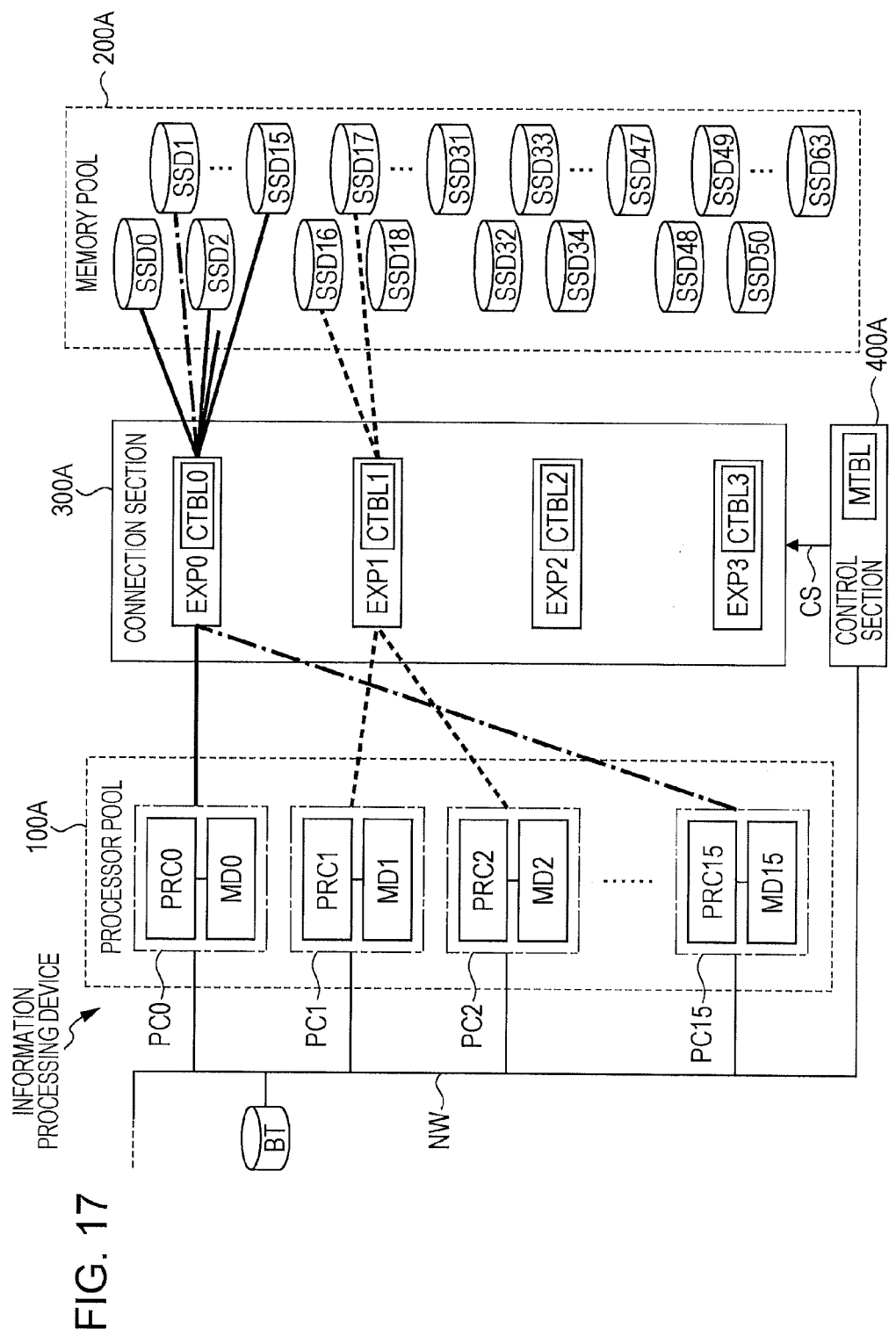
FIG. 17 is a diagram illustrating an example of connections in an information processing device when Step S78 of FIG. 16 is executed.

FIG. 17 is a diagram illustrating an example of connections in an information processing device when Step S78 of FIG. 16 is executed. In FIG. 17, cables connecting the computer devices PC and the storage devices SSD that are not connected via the expanders EXP are not illustrated. The bold solid lines, bold dashed line, and bold alternate long and short dash lines are similar to those in FIG. 12.

In this embodiment, data is not copied from the storage device SSD1 whose performance has been reduced to the storage device SSD15 that is to be newly used in the system, and thus, the storage device SSD15 is not connected to the processor PRC15 but is connected to the processor PRC0.

As has been described, also in this embodiment, similar to the information processing devices illustrated in FIG. 1 and FIG. 4, while increase in load of a processor PRC in a system is reduced, a storage device SSD whose performance has been reduced may be replaced with an unused storage device SSD, and the performance of the storage device SSD in the system may be recovered. Also, the construction of a virtual system is canceled after data copy processing and initialization processing for the storage device SSD are completed, and thus, the usability of the processors PRC provided in the processor pool 100A may be increased.

Furthermore, by constructing the RAID5 system or the RAID6 system, write processing of writing data to the storage device MD may be omitted, and data copy processing performed by the virtual system may be omitted. Thus, even when the storage device SSD whose performance has been reduced is replaced with the unused storage device SSD, data redundancy may be ensured and the reliability of the system may be increased.

Figure 18:
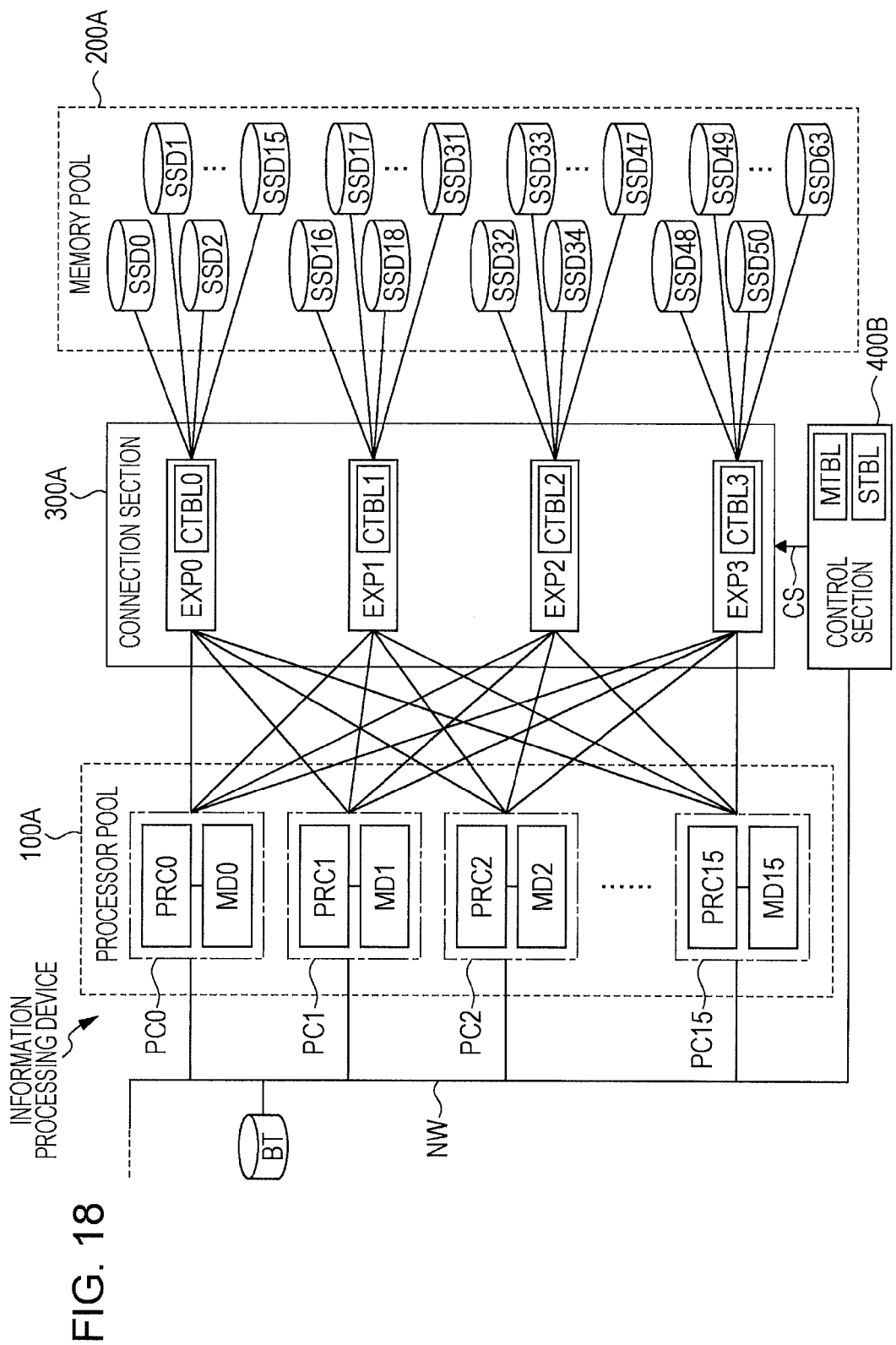
FIG. 18 is a diagram illustrating an information processing device according to another embodiment.

FIG. 18 is a diagram illustrating an information processing device according to another embodiment. In FIG. 18, those parts which are similar to or the same as those corresponding parts in FIG. 4 will be identified by the same reference characters, and therefore, the detail description thereof will be omitted. The information processing device of this embodiment includes a control section 400B, instead of the control section 400A of FIG. 4. Also, the processor pool 100A includes a hardware that is similar to or the same as that of the processor pool 100A illustrated in FIG. 4, but the performance monitoring table and the management program executed by each processor PRC are different from those of the embodiments illustrated in FIG. 4 to FIG. 14. The configurations of other components of the information processing device are similar to or the same as those of FIG. 4. An example of the management program executed by the processor PRC in the system is illustrated in FIG. 20 and an example of the performance monitoring table is illustrated in FIG. 21.

Similar to the information processing device of FIG. 4, the information processing device according to this embodiment constructs the RAID1 system and operates in a similar manner to that illustrated in FIG. 11 and FIG. 14. However, the information processing device may construct the RAID5 system or the RAID6 system and operate in a similar manner to that illustrated in FIG. 15 and FIG. 16.

The control section 400B includes an entire management table MTBL and a memory characteristic table STBL. The entire management table MTBL is similar to or the same as that of FIG. 6. An example of the memory characteristic table STBL is illustrated in FIG. 19. The control section 400B has a similar function to that of the control section 400A illustrated in FIG. 4, except that the storage device SSD with which the storage device SSD whose performance has been reduced is replaced is determined using the memory characteristic table STBL.

Figure 20:
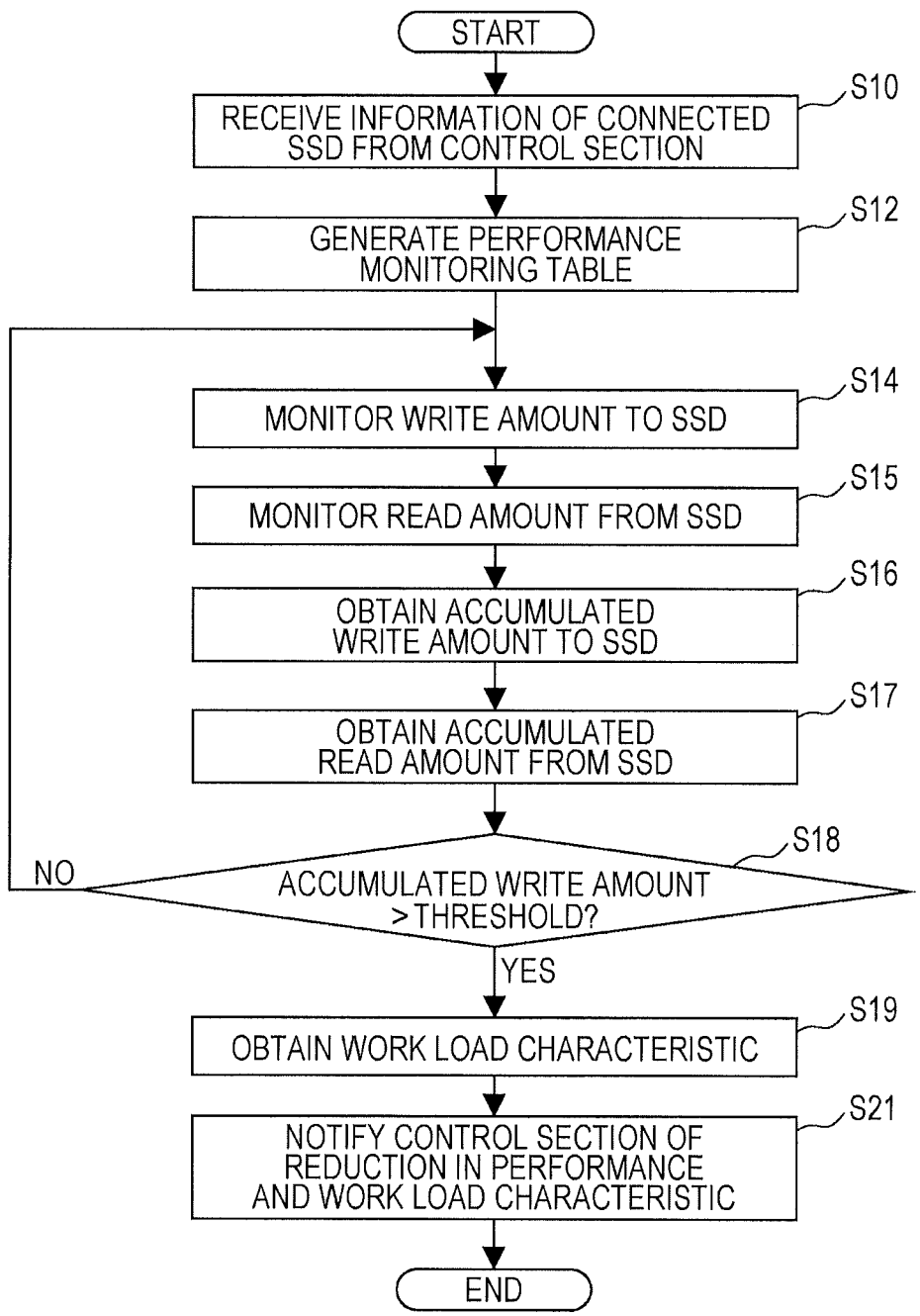
FIG. 20 is a flowchart of an example of detection of reduction in performance of a storage device performed by a processor illustrated in FIG. 18.

That is, on the basis of Step S18 of FIG. 20, the processor PRC in the system detects reduction in performances of the corresponding storage devices SSD on the basis of the accumulated write amount of the performance monitoring table illustrated in FIG. 20. After the storage device SSD whose performance has been reduced is cut out, the processor PRC in the system writes write data to the storage device MD or the storage device SSD which makes a pair with the storage device SSD whose performance has been reduced (for example, SSD0).

On the basis that the performance of the storage device SSD has been reduced, when there is an unused storage device SSD and an unused processor PRC, the control section 400B replaces the storage device SSD whose performance has been reduced with the unused storage device SSD. The processor PRC in a virtual system copies data in the storage device SSD whose performance has been reduced to the unused storage device SSD and initializes the storage device SSD whose performance has been reduced. The constructed virtual system is canceled after the initialization is completed.

FIG. 19 is a diagram illustrating an example of the memory characteristic table STBL illustrated in FIG. 18. In the memory characteristic table STBL, characteristics of the storage devices SSD that defer depending on a model or a manufacturer are stored in advance. In this embodiment, each of the storage devices SSD is classified to any one of the characteristics represented by the reference characters RD, WR, and RW, depending on its read-out characteristic and write characteristic.

The reference character RD indicates the storage device SSD whose data read-out characteristic is greater than its data write characteristic, the reference character WR indicates the storage device SSD that whose data write characteristic is greater than its data read-out characteristic, and the reference character RW indicates the other storage devices SSD whose data read-out characteristic and data write characteristic are not significantly different. For the storage devices SSD whose data read-out characteristics are greater than their data write characteristics, the numerical value "1" is stored in the corresponding RD areas, for the storage devices SSD whose data write characteristics are greater than their data read-out characteristics, the numerical value "1" is stored in the corresponding WR areas, and for the other storage devices SSD, the numerical value "1" is stored in the corresponding RW areas.

The control section 400B writes the numerical value to the memory characteristic table STBL before a user system is constructed (for example, when the operation of the information processing device is started). For example, the control section 400B writes the numerical value "1" to the RD areas of the storage devices SSD0 to SSD15 whose data read-out characteristics are greater than their data write characteristics. The control section 400B writes the numerical value "1" in the WR areas of the storage devices SSD16 to SSD31 whose data write characteristics are greater than their data read-out characteristics. Similarly, the control section 400B writes the numerical value "1" in the RW areas of the storage devices SSD32 to SSD63 whose data read-out characteristics and data write characteristics are not significantly different. Note that there may be cases where the RW areas are not provided in the memory characteristic table STBL and each of the storage devices SSD is classified to RD or WR.

For example, setting values for the entire management table MTBL and the connection management tables CTBL in an initial state in this embodiment are the same as those for the entire management table MTBL illustrated in FIG. 6 and the connection management tables CTBL illustrated in FIG. 7. That is, the initial system configuration of the information processing device in this embodiment is the same as that illustrated in FIG. 8, except that the control section 400B is different.

The entire management table MTBL and the connection management tables CTBL are generated on the basis of the memory characteristic table STBL illustrated in FIG. 19. For example, in FIG. 6, in the zone group 1 represented by the numerical value "1", which constructs a system, such as a web server and so forth, the frequency of update of data written in storage device SSD is lower than that in a system, such as a database and so forth. Thus, in the zone group 1, the storage devices SSD0 to SSD3 whose data read-out characteristics are greater than their data write characteristics are allocated. On the other hand, in FIG. 6, in the zone group 2 indicated by the numerical value "2", which constructs a system, such as a database and so forth, the frequency of update of data written in the storage device SSD is higher than that in a system, such as a web server and so forth. Thus, in the zone group 2, the storage devices SSD16 and SSD17 whose data write characteristics are greater than their data read-out characteristics are allocated.

FIG. 20 is a flowchart of an example of detection of reduction in performance of one of the storage devices SSD performed by the corresponding processor PRC illustrated in FIG. 18. The flow illustrated in FIG. 20 is implemented by executing the management program by the processor PRC in a constructed system. Steps S10, S12, S14, S16, and S18 are similar to or the same as those illustrated in FIG. 9. In Step S12, the processor PRC generates a performance monitoring table illustrated in FIG. 21, instead of the performance monitoring table illustrated in FIG. 10. Step S21 is implemented, instead of Step S20 illustrated in FIG. 9. Similar to the operation of FIG. 9, Steps S14, S15, S16, S17, S18, S19, and S21 are executed every several seconds or several minutes between executions of the user program.

After the data write amount of data written to the storage device SSD is monitored in Step S14, in Step S15, the processor PRC monitors data read amount of data read out from the storage device SSD. For example, the processor PRC monitors the data read amount using a command used for collecting statistic information provided in the operating system. For example, when the operating system is Linux, a sar command may be used.

After the accumulated write amount is obtained in Step S16, in Step S17, the processor PRC sequentially adds up the monitored data read amounts to obtain an accumulated read amount. In Step S18, when the accumulated write amount exceeds a threshold and it is determined that the performance of the corresponding storage device SSD has been reduced, the processor PRC executes the operation of Step S19.

Note that, when the condition that the accumulated write amount is obtained after monitoring the data write amount and the accumulated data read amount is obtained after monitoring the data read amount is satisfied, the order of Steps S14, S16, S18, and S20 may be interchanged. For example, the order of Steps S14 and S15 may be interchanged, and the order of Steps S16 and S17 may be interchanged. Also, the order of Steps S15 and S16 may be interchanged.

In Step S19, the processor PRC determines, for a storage device SSD whose performance has been reduced, a work load characteristic indicating the tendency for the types of accesses made by a system that executes the user program. In this embodiment, each system is classified to any one of the following three work load characteristics.

(1) The data read frequency is higher than the data write frequency, and the data read amount is greater than the data write amount.

(2) The data write frequency is higher than the data read frequency, and the data write amount is greater than the data read amount.

(3) A difference between the data read frequency and the data write frequency is small, and there is not a significant difference between the data read amount and the data write amount.

For example, if the ratio of read-out accesses of each storage device SSD is more than 60% of all accesses, it is determined that the work load characteristic is the work load characteristic (1). If the ratio of write accesses of each storage device SSD is more than 60% of all accesses, it is determined that the work load characteristic is the work load characteristic (2). If the system does not correspond to either the work load characteristic (1) or the work load characteristic (2), it is determined the work load characteristic is the work load characteristic (3). Note that the ratio of accesses on the basis of which the work load characteristic is determined may be more than 50%.

Next, in Step S21, the processor PRC notifies the control section 400A of the number of the storage device SSD whose performance has been reduced and the work load characteristic of the storage device SSD whose performance has been reduced.

The control section 400A that has received the notice from the processor PRC refers to the entire management table MTBL illustrated in FIG. 6 and the memory characteristic table STBL illustrated in FIG. 19 in Step S60 illustrated in FIG. 11. Then, the control section 400A detects whether or not, among unused storage devices SSD, there is any storage device SSD that matches the work load characteristic received from the processor PRC. If there is a storage device SSD that matches the work load characteristic, the control section 400A determines to replace the storage device SSD1 whose performance has been reduced with the unused storage device SSD. The other steps of the operation of the information processing device are similar to those illustrated in FIG. 11 to FIG. 14.

FIG. 21 is a diagram illustrating an example of a performance monitoring table generated by Step S12 illustrated in FIG. 20. Similar to FIG. 10, the performance monitoring table is generated for each zone group. In this example, the performance monitoring table is generated so as to correspond to the connection management tables CTBL illustrated in FIG. 7.

Each of the performance monitoring tables includes, for each storage device SSD that belongs to a zone group, an area in which a total capacity, an initial used capacity that indicates a capacity used when a system is constructed, a threshold, an accumulated write amount, and an accumulated read amount for the storage device SSD are stored. The total capacity, the initial used capacity, the threshold, and the accumulated write amount are similar to those in FIG. 10. In the zone group 1, the accumulated read amounts of the storage devices SSD0, SSD1, SSD2, and SSD3 are 50 gigabytes, 100 gigabytes, 320 gigabytes, and 15 gigabytes, respectively. In the zone group 2, the accumulated read amounts of the storage devices SSD16 and SSD17 are 5 gigabytes and 10 gigabytes, respectively. FIG. 21 illustrates a state where the system has been operated for a while since the zone group 1 and the zone group 2 were constructed.

As has been described, also in this embodiment, similar to the information processing devices illustrated in FIG. 1 and FIG. 4, while increase in load of a processor PRC in a system is reduced, a storage device SSD whose performance has been reduced may be replaced with an unused storage device SSD, and the performance of the storage device SSD in the system may be recovered. Also, the construction of a virtual system is canceled after data copy processing and initialization processing of initializing the storage device SSD are completed, and thus, the usability of the processors PRC provided in the processor pool 100A may be increased. Moreover, data redundancy may be ensured, and the reliability of the system may be increased.

Furthermore, by obtaining the work load characteristic of each storage device SSD used in the system and replacing the storage device SSD whose performance has been reduced with an unused storage device SSD that matches the work load characteristic of the storage device SSD, the system may be operated without reduction in performance of the system.

FIG. 22 is a diagram illustrating an example of a memory characteristic table STBL according to another embodiment. An information processing device according to this embodiment is similar to the information processing device illustrated in FIG. 18, except that the memory characteristic table STBL and the management program executed by each processor PRC are different. The entire management table MTBL, the connection management tables CTBL, and the performance monitoring table are similar to or the same as those illustrated in FIG. 6, FIG. 7, and FIG. 21.

That is, on the basis of Step S18 of FIG. 20, the processor PRC in the system detects reduction in performances of the corresponding storage devices SSD on the basis of the accumulated write amount in the performance monitoring table illustrated in FIG. 20. The processor PRC in the system writes, after the storage device SSD whose performance has been reduced is cut out, write data to the storage device MD or the storage device SSD which makes a pair with the storage device SSD whose performance has been reduced (for example, SSD0).

On the basis that the performance of the storage device SSD has been reduced, if there is an unused storage device SSD and an unused processor PRC, the control section 400B illustrated in FIG. 18 replaces the storage device SSD whose performance has been reduced with the unused storage device SSD. The processor PRC in a virtual system copies data in the storage device SSD whose performance has been reduced to the unused storage device SSD, and initializes the storage device SSD whose performance has been reduced. The constructed virtual system is canceled after the initialization is completed.

Similar to the information processing device of FIG. 4, the information processing device according to this embodiment constructs the RAID1 system and operates in a similar manner to that illustrated in FIG. 11 and FIG. 14. However, the information processing device may construct the RAID5 system or the RAID6 system and operate in a similar manner to that illustrated in FIG. 15 and FIG. 16.

In the memory characteristic table STBL, characteristics of the storage devices SSD that defer depending on a model or a manufacturer are stored in advance. In this embodiment, each of the storage devices SSD is classified to any one of the characteristics represented by the reference characters RDS, RDR, WRS, WRR, and RW.

The reference character RDS indicates the storage device SSD whose sequential data read-out characteristic is greater than the other characteristics, and the reference character RDR indicates the storage device SSD whose data random read-out characteristic is greater than the other characteristics. The reference character WRS indicates the storage device SSD whose sequential data write characteristic is greater than the other characteristics, and the reference character WRR indicates the storage device SSD whose data random write characteristic is greater than the other characteristics. The reference character RW indicates the other storage devices SSD whose data read-out characteristic and data write characteristic are not significantly different.

For example, each of a sequential read-out and a sequential write indicates that an access area of the storage device SSD specified by the processor PRC is continuous. Each of a random read-out and a random write indicates that an access area of the storage device SSD specified by the processor PRC is discontinuous.

Similar to the memory characteristic table STBL of FIG. 19, for the storage devices SSD whose sequential data read-out characteristics are greater than the other characteristics, the numerical value "1" is stored in the corresponding RDS areas, for the storage devices SSD whose data random read-out characteristics are greater than the other characteristics, the numerical value "1" is stored in the corresponding RDR areas. For the storage devices SSD whose sequential data write characteristics are greater than the other characteristics, the numerical value "1" is stored in the corresponding WRS areas, for the storage devices SSD whose data random write characteristics are greater than the other characteristics, the numerical value "1" is stored in the corresponding WRR areas. For the storage devices SSD whose data read-out characteristics and data write characteristics are not significantly different, the numerical value "1" is stored in the corresponding RW areas.

The management program executed by the processor PRC constructed as a system is similar to that illustrated in FIG. 20, except that the operation of Step S19 is different. In Step S19, the processor PRC determines a work load characteristic indicating the tendency of the types of accesses made by a system that executes the user program for a storage device SSD whose performance has been reduced.

In this embodiment, each system is classified to any one of the following five work load characteristics.

(4) The frequency of sequential data read-out is higher than the frequency of other types of accesses, and the sequential data read amount is greater than the random data read amount, the sequential data write amount, and the random data write amount.

(5) The frequency of random data read-out is higher than the frequency other types of accesses, and the random data read amount is greater than the sequential read amount, the sequential data write amount, and the random data write amount.

(6) The frequency of sequential data write is higher than the frequency of other types of accesses, and the sequential data write amount is greater than the sequential data read amount, the random data read amount, and the random data write amount.

(7) The frequency of random data write is higher than the frequency of other types of accesses, and the random data write amount is greater than the sequential data read amount, the random data read amount, and the sequential data write amount.

(8) A difference between the frequency of read-out and the frequency of write is small, and the sequential data read amount, the random data read amount, the sequential data write amount, and the random data write amount are not significantly different.

For example, if the ratio of sequential read-out accesses of each storage device SSD is over 60% of all accesses, it is determined that the work load characteristic is the work load characteristic (4). If the ratio of random accesses of each storage device SSD is more than 60% of all accesses, it is determined that the work load characteristic is the work load characteristic (5). If the ratio of sequential write accesses of each storage device SSD is more than 60% of all accesses, it is determined that the work load characteristic is the work load characteristic (6). If the ratio of random write accesses of each storage device SSD is more than 60% of all accesses, it is determined that the work load characteristic is the work load characteristic (7). If the system does not correspond to any one of the work load characteristics (4), (5), (6), and (7), it is determined that the work load characteristic is the work load characteristic (8). Note that the ratio of accesses on the basis of which the work load characteristic is determined may be more than 50%.

The control section 400A that has received the work load characteristic of the storage device SSD whose performance has been reduced from the processor PRC in Step S21 of FIG. 20 refers to the entire management table MTBL illustrated in FIG. 6 and the memory characteristic table STBL illustrated in FIG. 22 in Step S60 illustrated in FIG. 11. Then, the control section 400A detects whether or not, among unused storage sections SSD, there is any storage device SSD that matches the work load characteristic received from the processor PRC. If there is an unused storage device SSD that matches the work load characteristic, the control section 400A determines to replace the storage device SSD1 whose performance has been reduced with the unused storage device SSD. The other steps of the operation of the information processing device are the same as those illustrated in FIG. 11 to FIG. 14.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a plurality of arithmetic processing devices;
a plurality of storage devices;
a connection section that couples a first arithmetic processing device, among the plurality of arithmetic processing devices, to a first storage device and a second storage device, among the plurality of storage devices, so that the same data is written in the first storage device and the second storage device; and
a control section that
causes, when the performance of the second storage device is reduced, the connection section to cut out the second storage device from the first arithmetic processing device and the first storage device,
causes the connection section to couple a third storage device among the plurality of storage devices to the first arithmetic processing device and the first storage device,
causes the connection section to couple a second arithmetic processing device among the plurality of arithmetic processing devices to the second storage device, and
causes the second arithmetic processing device to initialize the second storage device.

2. The information processing device according to claim 1, wherein the control section:
causes, before causing the connection section to couple the third storage device to the first arithmetic processing device, the connection section to couple the second storage device and the third storage device to the second arithmetic processing device; and
causes the second arithmetic processing device to copy data stored in the second storage device to the third storage device.

3. The information processing device according to claim 2, further comprising:
a memory buffer connected to the first arithmetic processing device,
wherein the first arithmetic processing device writes, after the second storage device is cut out, data to the memory buffer, instead of writing the data to the first storage device, and
the control section causes, after causing the connection section to connect the third storage device to which data has been copied to the first arithmetic processing device, the first arithmetic processing device to write the data which has been written to the memory buffer to the first storage device and the third storage device.

4. The information processing device according to claim 3, wherein, if, after the second storage device whose performance has been reduced is cut out, there is a shortage in an area of the memory buffer in which data is to be written, the first arithmetic processing device writes data to the first storage device, writes the data which has been written to the memory buffer to the first storage device and the third storage device, and then, synchronizes the data stored in the first storage device and the data stored in the third storage device with each other.

5. The information processing device according to claim 1, wherein the control section causes, after causing the second arithmetic processing device to initialize the second storage device, the connection section to release connection of the second arithmetic processing device and the second storage device.

6. The information processing device according to claim 1, wherein, if the accumulated write amount of data written to the second storage device exceeds a threshold, the first arithmetic processing device detects reduction in the performance of the second storage device, and
the control section cuts out, on the basis that the control section has received a notice of reduction in the performance of the second storage device from the first arithmetic processing device, the second storage device whose performance has been reduced from the first arithmetic processing device.

7. The information processing device according to claim 1, wherein the plurality of storage devices includes a storage device whose data read-out characteristic is greater than its data write characteristic and a storage device whose data write characteristic is greater than its data read-out characteristic,
the first arithmetic processing device monitors the read amount of data read out from the second storage device and the write amount of data written to the second storage device to obtain which of the data write amount and the data read amount for the second storage device is greater, and
the control section causes, if the data read amount is greater than the data write amount, the connection section to interchange the third storage device whose data read-out characteristic is greater and the storage second device whose performance has been reduced, and causes, if the data write amount is greater than the data read amount, the connection section to interchange the third storage device whose data write characteristic is greater and the second storage device whose performance has been reduced.

8. The information processing device according to claim 7, wherein the plurality of storage devices includes a storage device whose sequential data read-out characteristic is greater than the other characteristics, a storage device whose random data read-out characteristic is greater than the other characteristics, a storage device whose sequential data write characteristic is greater than the other characteristics, and a storage device whose random data write characteristic is greater than the other characteristics,
the control section causes, if a sequential data read amount is greater than a random data read amount, a sequential data write amount, and a random data write amount, the connection section to interchange the third storage device whose sequential data read-out characteristic is greater than the other characteristics and the second storage device whose performance has been reduced, causes, if the random data read amount is greater than the sequential data read amount, the sequential data write amount, and the random data write amount, the connection section to interchange the third storage device whose random data read-out characteristic is greater than the other characteristics and the second storage device whose performance has been reduced, causes, if the sequential data write amount is greater than the sequential data read amount, the random data read amount, and the random data write amount, the connection section to interchange the third storage device that is the storage device whose sequence data write-out characteristic is greater than the other characteristics and the second storage device whose performance has been reduced, and causes, if the random data write amount is greater than the sequential data read amount, the random data read amount, and the sequential data write amount, the connection section to interchange the third storage device whose random data write characteristic is greater than the other characteristics and the second storage device whose performance has been reduced.

9. The information processing device according to claim 1, wherein the storage devices include a flash memory.

10. The information processing device according to claim 1, wherein, if, before the performance of the second storage device is reduced, the second arithmetic processing device is connected to any one of the plurality of storage devices, or the third storage device is connected to the plurality of arithmetic processing devices, the control section causes, even when the performance of the second storage device is reduced, the connection section to maintain connection of the first arithmetic processing device and the second storage device.

11. A method for controlling an information processing device including a control section, a plurality of arithmetic processing devices, a plurality of storage devices, a connection section that couples a first arithmetic processing device, among the plurality of arithmetic processing devices, to a first storage device and a second storage device, among the plurality of storage devices, so that the same data is written in the first storage device and the second storage device, the method comprising:
causing the control section
to cause, when the performance of the second storage device is reduced, the connection section to cut out the second storage device from the first arithmetic processing device and the first storage device,
to cause the connection section to couple a third storage device among the plurality of storage devices to the first arithmetic processing device and the first storage device,
to cause the connection section to couple a second arithmetic processing device, among the plurality of arithmetic processing devices, to the second storage device, and
to cause the second arithmetic processing device to initialize the second storage device.

* * * * *